(12) United States Patent
Wang et al.

(10) Patent No.: US 11,343,876 B2
(45) Date of Patent: May 24, 2022

(54) METHOD AND APPARATUS FOR BEAM FAILURE RECOVERY

(71) Applicant: Apple Inc., Cupertino, CA (US)

(72) Inventors: Guotong Wang, Beijing (CN); Yushu Zhang, Beijing (CN); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 16/646,311

(22) PCT Filed: Sep. 10, 2018

(86) PCT No.: PCT/CN2018/104815
§ 371 (c)(1),
(2) Date: Mar. 11, 2020

(87) PCT Pub. No.: WO2019/047948
PCT Pub. Date: Mar. 14, 2019

(65) Prior Publication Data
US 2020/0275524 A1    Aug. 27, 2020

(30) Foreign Application Priority Data

Sep. 11, 2017  (CN) ................. PCT/CN2017/101238
Sep. 18, 2017  (CN) ................. PCT/CN2017/102072
Sep. 30, 2017  (CN) ................. PCT/CN2017/104762

(51) Int. Cl.
*H04W 88/06*    (2009.01)
*H04W 76/30*    (2018.01)
(Continued)

(52) U.S. Cl.
CPC .......... *H04W 88/06* (2013.01); *H04B 7/0626* (2013.01); *H04B 7/0695* (2013.01);
(Continued)

(58) Field of Classification Search
CPC . H04W 76/30; H04W 76/27; H04W 74/0833; H04B 7/0695; H04B 7/088
See application file for complete search history.

(56) References Cited

U.S. PATENT DOCUMENTS

2019/0058629 A1*  2/2019  Akoum ............... H04W 56/001
2020/0014453 A1*  1/2020  Takeda ................ H04W 56/001
(Continued)

FOREIGN PATENT DOCUMENTS

WO        2017/024516 A1      2/2017

OTHER PUBLICATIONS

International Search Report dated Nov. 28, 2018 for International Application No. PCT/CN2018/104815.
(Continued)

*Primary Examiner* — Fahmida S Chowdhury
(74) *Attorney, Agent, or Firm* — Eschweiler & Potashnik, LLC

(57) ABSTRACT

Provided herein are method and apparatus for beam recovery. An embodiment provides an apparatus for a user equipment (UE) including a radio frequency (RF) interface; and processing circuitry configured to: determine, in response to a beam failure, a channel for transmission of a beam failure recovery request as one of: a Physical Uplink Control Channel (PUCCH), a non-contention based Physical Random Access Channel (PRACH), and a contention based Physical Random Access Channel (PRACH); and encode the beam failure recovery request for transmission to an access node via the determined channel using the RF interface. At least some embodiments allow for transmission of a beam failure recovery request for beam recovery, allow for beam failure detection or new Tx beam identification, and allow for determining whether to configure a scheduling delay between a PDCCH and a PDSCH.

25 Claims, 14 Drawing Sheets

(51) Int. Cl.

| | | |
|---|---|---|
| *H04W 76/27* | (2018.01) | |
| *H04B 7/06* | (2006.01) | |
| *H04B 7/08* | (2006.01) | |
| *H04L 5/00* | (2006.01) | |
| *H04W 56/00* | (2009.01) | |
| *H04W 74/08* | (2009.01) | |

(52) U.S. Cl.
CPC .......... *H04B 7/088* (2013.01); *H04L 5/0051* (2013.01); *H04W 56/001* (2013.01); *H04W 74/0833* (2013.01); *H04W 76/27* (2018.02); *H04W 76/30* (2018.02)

(56) References Cited

U.S. PATENT DOCUMENTS

| | | | |
|---|---|---|---|
| 2020/0120714 A1* | 4/2020 | Wang | H04W 16/28 |
| 2020/0186218 A1* | 6/2020 | Wu | H04B 7/0632 |
| 2020/0389220 A1* | 12/2020 | Kang | H04W 74/0833 |

OTHER PUBLICATIONS

"WF on Beam Failure Recovery." MediaTek, Ericsson, Samsung, KT Corp., InterDigital, [ZTE, CATT, OPPO, Intel, HW, HiSilicon, vivo], 3GPP TSG RAN WG1 Meeting #88b, Spokane, USA, Apr. 3-7, 2017, Agenda item: 8.1.2.2.2. R1-1706633.

"Link recovery procedure for beam failure." Source: Huawei, HiSilicon. Agenda Item: 8.1.2.2.2. 3GPP TSG RAN WG1 Meeting #88b, Spokane, USA, Apr. 3-7, 2017. R1-1704230.

"Discussion on recovery from beam failure." Source: Samsung. Agenda Item: 8.1.2.2.2. 3GPP TSG RAN WG1 Meeting #88bis, Spokane, USA Apr. 3-7, 2017. R1-1705343.

Supplementary European Search Report dated Apr. 27, 2021 for EP Application No. EP18854285.

Qualcomm Incorporated: "Beam Recovery Request"; 3GPP Draft; R2-1709085, vol. RAN WG2, no. Bedin, Germany; Aug. 21, 2017-Aug. 25, 2017; Aug. 20, 2017; http://www.3gpp.org/ftp/Meetings_3GPP_SYNC/RAN2/Docs/.

Spreadtrum Communications: "Discussion on UE Initiated recovery from beam failure"; 3GPP Draft; R1-1713047; vol. RAN WG1, no. Prague, Czech Republic; Aug. 21, 2017-Aug. 25, 2017; Aug. 20, 2017; http://www.3gpp.org/ftp/Meetings)3GPP_SYNC/RAN1/Docs/.

ZTE: "Discussion on Mechanism to Recovery from Beam Failure"; 3GPP Draft; R1-1712300; vol. RAN WG1, no. Prague, Czechia; Aug. 21, 2017-Aug. 25, 2017; Aug. 20, 2017; http://www.3gpp.org/ftp/Meetings_3GPP_SYNC/RAN1/Docs.

MEDIATEK: "Offline Discussion Summary on Beam Recovery"; 3GPP Draft; R1-1711897; vol. TSG RAN, no. Qingdao, China; Jun. 27, 2017-Jun. 30, 2017; Jul. 1, 2017; http://www.3gpp.org/ftp/tsg_ran/WG1_RL1/TSGR1_AH/NR_AH_1706/Docs.

3GPP TS 38.321 V0.3.0; Technical Specification; "Technical Specification Group Radio Access Network; NR; Medium Access Control (MAC) protocol specification (Release 15)"; Aug. 2017.

* cited by examiner

METHOD AND APPARATUS FOR BEAM FAILURE RECOVERY

CROSS REFERENCES TO RELATED APPLICATIONS

This application is a National Phase entry application of International Patent Application No. PCT/CN2018/104815 filed on Sep. 10, 2018, which claims priority to International Application No. PCT/CN2017/101238 filed on Sep. 11, 2017, entitled "BEAM FAILURE RECOVERY REQUEST TRANSMISSION IN NEW RADIO SYSTEMS", International Application No. PCT/CN2017/104762 filed on Sep. 30, 2017, entitled "BEAM FAILURE DETECTION WITH POWER OFFSET IN NEW RADIO SYSTEMS", and International Application No. PCT/CN2017/102072 filed on Sep. 18, 2017, entitled "BEAM INDICATION WITH SCHEDULING DELAY IN NEW RADIO SYSTEMS", and are hereby incorporated by reference in its entirety.

TECHNICAL FIELD

Embodiments of the present disclosure generally relate to a method and apparatus for wireless communications, and in particular to a method and apparatus for beam failure recovery.

BACKGROUND ART

In a Multiple-Input and Multiple-Output (MIMO) system (such as a fifth generation (5G) New Radio (NR) system), a beam failure recovery mechanism may include the following aspects: detection of a beam failure by a user equipment (UE), identification of a new candidate beam by the UE, transmission of a beam failure recovery request from the UE to an access node (such as a next Generation NodeB (gNB)), and monitoring of a response for the beam failure recovery request from the access node. In addition, in a MIMO system (such as a 5G NR system), beam forming may be used at both an access node or a Transmission Reception Point (TRP) (such as a next Generation NodeB (gNB)) and a UE. Beam management may be used to acquire and maintain beams of the access node or TRP and UE (such as gNB beams and UE beams) for communication. Reference signals for beam management may include a Synchronization Signal (SS) block and a Channel State Information Reference Signal (CSI-RS). The UE should keep monitoring beam quality, and if beams for all serving control channels have failed (e.g., below a certain threshold), the UE may trigger or declare a beam failure. Then the beam failure recovery mechanism may be used, wherein the UE may identify one or more new transmit (Tx) beams of the access node for beam failure recovery. Transmission of a beam failure recovery request may be based on a Physical Uplink Control Channel (PUCCH), or a non-contention based Physical Random Access Channel (PRACH).

For downlink (DL) transmission, a beam management procedure may include the following aspects: P-1, P-2 and P-3. P-1 may be used to obtain one or more initial Tx beams of the access node or TRP and one or more initial receive (Rx) beams of the UE, P-2 may be used to enable refinement of the Tx beams of the access node or TRP, and P-3 may be used to enable refinement of the Rx beams of the UE. After beam measurement, the UE may transmit a beam reporting to the access node or TRP, wherein the beam reporting may indicate which one or more Tx beams are good for communication. The beam reporting may include one or more Tx beam indexes or Beam Pair Link (BPL) indexes, and may also include beam quality of one or more Tx beams corresponding to the Tx beam indexes or BPL indexes. The access node or TRP may transmit a beam indication to the UE so as to inform the UE if there is a need to switch a current Rx beam.

SUMMARY

An embodiment of the disclosure provides an apparatus for a user equipment (UE) including a radio frequency (RF) interface; and processing circuitry configured to: determine, in response to a beam failure, a channel for transmission of a beam failure recovery request as one of: a Physical Uplink Control Channel (PUCCH), a non-contention based Physical Random Access Channel (PRACH), and a contention based Physical Random Access Channel (PRACH); and encode the beam failure recovery request for transmission to an access node via the determined channel using the RF interface.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Figure 1:
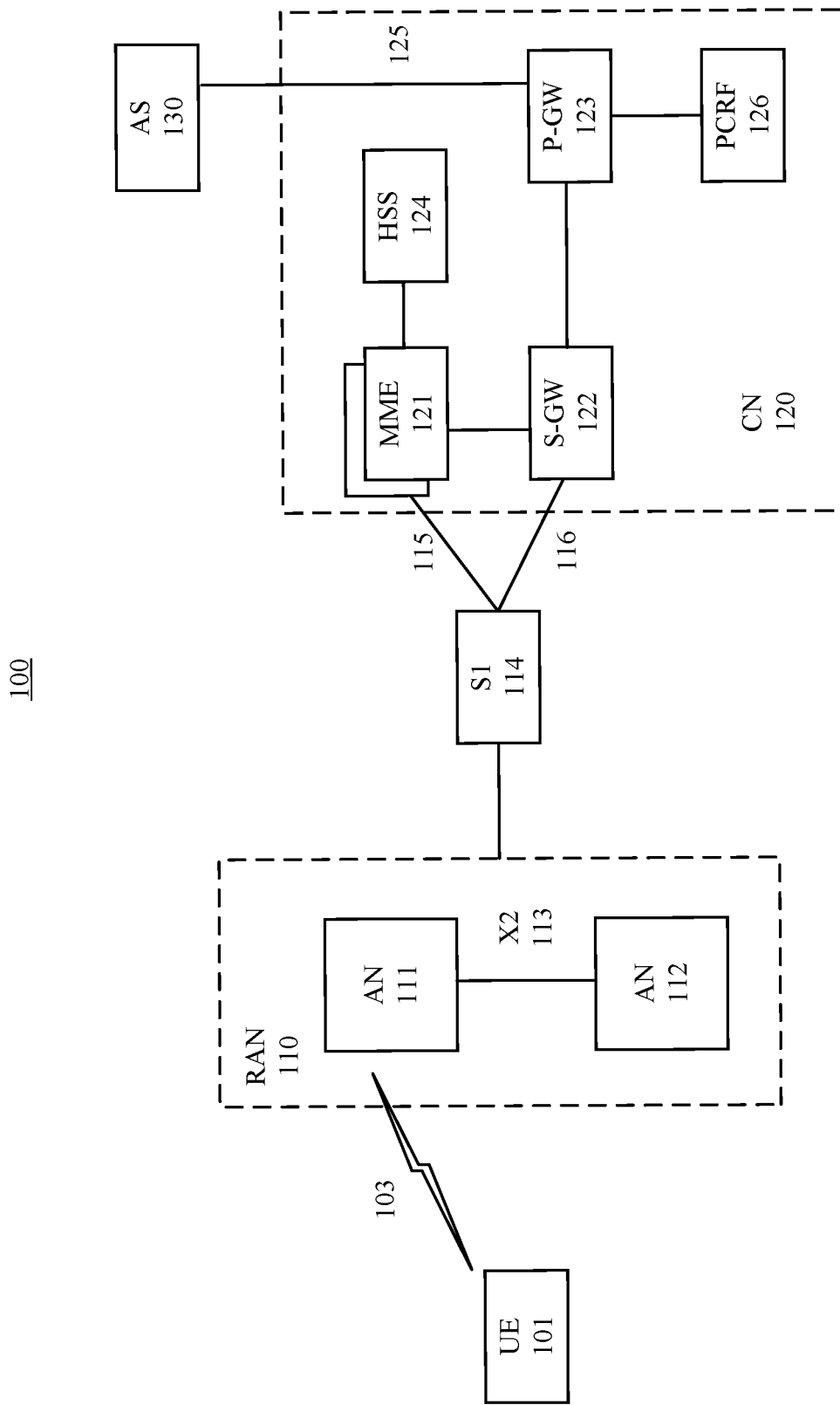
FIG. 1 shows an architecture of a system of a network in accordance with some embodiments of the disclosure.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

As discussed previously, a beam failure recovery mechanism may include the following aspects: detection of a beam failure by a UE, identification of a new candidate beam by the UE, transmission of a beam failure recovery request from the UE to an access node (such as a gNB), and monitoring of a response for the beam failure recovery request from the access node. Transmission of a beam failure recovery request may be based on a PUCCH, or a non-contention based PRACH. However, transmission of a beam failure recovery request via a PUCCH or a non-contention based PRACH requires that one or more resources for the PUCCH or the non-contention based PRACH are configured by an access node in advance. Therefore, there is a general need for a method for transmission of a beam failure recovery request.

The present disclosure provides approaches to perform transmission of a beam failure recovery request. In accordance with some embodiments of the disclosure, in response to a beam failure, a channel for transmission of a beam failure recovery request may be determined as one of: a PUCCH, a non-contention based PRACH, and a contention based PRACH. Then the beam failure recovery request may be encoded for transmission to an access node via the determined channel.

For downlink (DL) transmission, an access node (e.g., a gNB) may maintain a plurality of Tx beams, and a UE may maintain a plurality of receive (Rx) beams. There may be one or more BPLs between the access node and the UE, wherein each of the BPLs may be formed by a Tx beam of the access node and a Rx beam of the UE. Different Tx beams of the access node may be transmitted with different Tx power, i.e., different Energy per Resource Element (EPRE). Therefore, there is a need for a method to perform beam failure detection and new Tx beam identification based on EPRE information (such as power offset) for different beams.

The present disclosure provides approaches to perform beam failure detection and new Tx beam identification. In accordance with some embodiments of the disclosure, a message received from an access node may be decoded, wherein the message may identify one of: a first power offset for a first beam of the access node for a Reference Signal (RS), and a first threshold for beam failure detection of the first beam. A second threshold for beam failure detection of the first beam may be determined based on the message, and beam failure detection of the first beam may be performed based on the second threshold. In accordance with some embodiments of the disclosure, the message may further identify one of: a second power offset for a second beam of the access node for the RS, and a fourth threshold for identifying whether the second beam is a new Tx beam of the access node. A fifth threshold for identifying a new Tx beam may be determined based on the message, and whether the second beam is a new Tx beam may be identified based on the fifth threshold.

As discussed previously, the access node or TRP may transmit a beam indication to the UE so as to inform the UE if there is a need to switch an original or current Rx beam of the UE. The beam indication may be based on the beam measurement and beam reporting. The beam indication may be based on the Tx beam indexes or BPL indexes. For a physical downlink shared channel (PDSCH), a beam indication signaling is carried over downlink control information (DCI) via a physical downlink control channel (PDCCH) associated with the PDSCH. If the Rx beam of the UE needs to be switched, the UE has to decode the DCI with the original or current Rx beam first due to analog beamforming, and then switch to a new Rx beam for subsequent data reception, and thus there should be a scheduling delay between the PDCCH and actual data transmission over the PDSCH. However, in some cases, the scheduling delay may not be necessary if the original or current Rx beam of the UE doesn't need to be switched. That is to say, if only a Tx beam of the access node or TRP needs to be switched and the original or current Rx beam of the UE doesn't need to be switched, then there is no need for a scheduling delay between the beam indication signaling (or the PDCCH) and actual data transmission over the PDSCH. Therefore, there is a need for a method to determine whether to configure a scheduling delay between a PDCCH and a PDSCH.

The present disclosure provides approaches to determine whether to configure a scheduling delay between a PDCCH and a PDSCH. In accordance with some embodiments of the disclosure, a beam indication message may be encoded for transmission via a PDCCH to a UE, wherein the beam indication message may identify a new Rx beam of the UE for reception of data via a PDSCH associated with the PDCCH. Then whether to configure a scheduling delay between the PDCCH and the PDSCH may be determined based on the beam indication message.

FIG. 1 illustrates an architecture of a system 100 of a network in accordance with some embodiments. The system 100 is shown to include a user equipment (UE) 101. The UE 101 is illustrated as a smartphone (e.g., handheld touchscreen mobile computing devices connectable to one or more cellular networks), but may also include any mobile or non-mobile computing device, such as a personal data assistant (PDA), a tablet, a pager, a laptop computer, a desktop computer, a wireless handset, or any computing device including a wireless communications interface.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a NextGen RAN (NG RAN), or some other type of RAN. The UE 101 may utilize a connection 103 which comprises a physical communications interface or layer (discussed in further detail below); in this example, the connection 103 is illustrated as an air interface to enable communicative coupling and may be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs) that enable the connection 103. These access nodes may be referred to as base stations (BSs), NodeBs, evolved NodeBs (eNBs), next Generation NodeBs (gNB), RAN nodes, and so forth, and may include ground stations (e.g., terrestrial access points) or satellite stations providing coverage within a geographic area (e.g., a cell). As shown in FIG. 1, for example, the RAN 110 may include AN 111 and AN 112. The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to macro ANs. For example, one or both of the AN 111 and AN 112 may be a low power (LP) AN. In an embodiment, the AN 111 and AN 112 may be the same type of AN. In another embodiment, they are different types of ANs.

Any of the ANs 111 and 112 may terminate the air interface protocol and may be the first point of contact for the UE 101. In some embodiments, any of the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UE 101 may be configured to communicate using Orthogonal Frequency-Division Multiplexing (OFDM) communication signals with any of the ANs 111 and 112 or with other UEs (not shown) over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the embodiments is not limited in this respect. The OFDM signals may include a plurality of orthogonal subcarriers.

In some embodiments, a downlink resource grid may be used for downlink transmissions from any of the ANs 111 and 112 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 101. The physical downlink control channel (PDCCH) may carry information about the transport format and resource allocations related to the PDSCH channel, among other things. It may also inform the UE 101 about the transport format, resource allocation, and H-ARQ (Hybrid Automatic Repeat Request) information related to the uplink shared channel. Typically, downlink scheduling (assigning control and shared channel resource blocks to the UE 101 within a cell) may be performed at any of the ANs 111 and 112 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 114. In some embodiments, the CN 120 may be an evolved packet core (EPC) network, a NextGen Packet Core (NPC) network, or some other type of CN. In an embodiment, the S1 interface 114 is split into two parts: the S1-mobility management entity (MME) interface 115, which is a signaling interface between the ANs 111 and 112 and MMEs 121; and the S1-U interface 116, which carries traffic data between the ANs 111 and 112 and the serving gateway (S-GW) 122.

In an embodiment, the CN 120 may comprise the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an embodiment, the P-GW 123 is communicatively coupled to an application server 130 via an IP communications interface 125. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
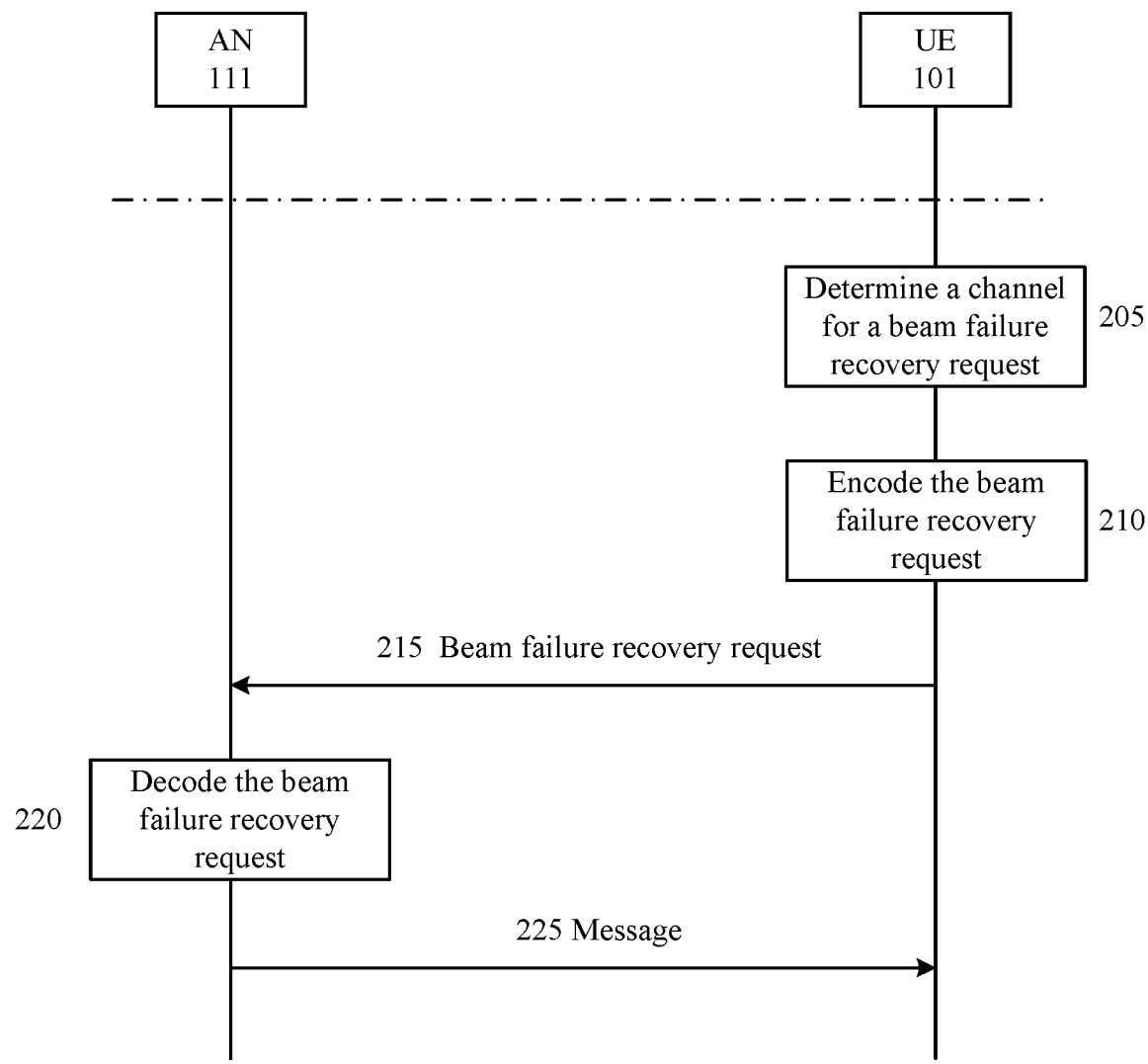
FIG. 2 is a flow chart showing operations for beam recovery in accordance with some embodiments of the disclosure.

FIG. 2 is a flow chart showing operations for beam recovery in accordance with some embodiments of the disclosure. The operations of FIG. 2 may be used for a UE (e.g., UE 101) to encode a beam failure recovery request for transmission to an AN (e.g., AN 111) of a RAN (e.g., RAN 110) for beam recovery.

At 205, the UE 101 may determine, in response to a beam failure, a channel for transmission of a beam failure recovery request as one of: a PUCCH, a non-contention based PRACH, and a contention based PRACH. Then at 210, the UE 101 may process (e.g., modulate, encode, etc.) the beam failure recovery request for transmission to the AN 111 via the determined channel. At 215, the UE 101 may transmit the processed beam failure recovery request to the AN 111 via the determined channel.

In an embodiment, at 205, the UE 101 may determine the channel as the contention based PRACH if no resource is available for the PUCCH and the non-contention based PRACH. Transmission of a beam failure recovery request via the PUCCH or the non-contention based PRACH requires that one or more resources for the PUCCH or the non-contention based PRACH are configured by the AN 111 in advance. Therefore, in the case that no resource is available for the PUCCH and the non-contention based PRACH, the contention based PRACH may be used as a fall back mode for transmission of the beam failure recovery request.

In an embodiment, the UE 101 may determine the channel as the PUCCH at 205, and then encode and transmit the beam failure recovery request to the AN 111 via the PUCCH at 210 and 215 respectively. If no response is received from the AN 111 after transmission of the beam failure recovery request via the PUCCH at 215, the UE 101 may then perform a re-transmission of the beam failure recovery request via the PUCCH. In response to the re-transmission via the PUCCH is performed for a predetermined number or for a predetermined period without receiving a response from the AN 111, the UE 101 may re-determine the channel as one of the contention based PRACH and the non-contention based PRACH, and then perform a transmission of the beam failure recovery request via the re-determined channel. The UE 101 may re-determine the channel as the contention based PRACH if no resource is available for the non-contention based PRACH, and the UE 101 may re-determine the channel as the non-contention based PRACH if there are available resources for the non-contention based PRACH. Therefore, in this embodiment, the UE 101 may transmit the beam failure recovery request to the AN 111 via the PUCCH first, and if no response is received, the UE 101 may attempt to re-transmit the beam failure recovery request via the PUCCH for several times or for a certain period. If no response is received after the attempt, the UE 101 may fall back to the contention based PRACH or the non-contention based PRACH for transmission of the beam failure recovery request.

In an embodiment, at 205, the UE 101 may determine the channel as the non-contention based PRACH if a beam correspondence is available at the UE 101, and then encode and transmit the beam failure recovery request to the AN 111 via the non-contention based PRACH at 210 and 215 respectively. If no response is received from the AN 111 after transmission of the beam failure recovery request via the non-contention based PRACH at 215, the UE 101 may then perform a re-transmission of the beam failure recovery request via the non-contention based PRACH. In response to the re-transmission via the non-contention based PRACH is performed for a predetermined number or for a predetermined period without receiving a response from the AN 111, the UE 101 may re-determine the channel as the contention based PRACH, and then perform a transmission of the beam failure recovery request via the contention based PRACH.

In another embodiment, at 205, the UE 101 may determine the channel as the PUCCH if no beam correspondence is available at the UE 101, and then encode and transmit the beam failure recovery request to the AN 111 via the PUCCH at 210 and 215 respectively. If no response is received from the AN 111 after transmission of the beam failure recovery request via the PUCCH at 215, the UE 101 may then perform a re-transmission of the beam failure recovery request via the PUCCH. In response to the re-transmission via the PUCCH is performed for a predetermined number or for a predetermined period without receiving a response from the AN 111, the UE 101 may re-determine the channel as the non-contention based PRACH, and then perform a transmission of the beam failure recovery request via the non-contention based PRACH. If no response is received from the AN 111 after transmission of the beam failure recovery request via the non-contention based PRACH, the UE 101 may then perform a re-transmission of the beam failure recovery request via the non-contention based PRACH. In response to the re-transmission via the non-contention based PRACH is performed for a predetermined number or for a predetermined period without receiving a response from the AN 111, the UE 101 may re-determine the channel as the contention based PRACH, and then perform a transmission of the beam failure recovery request via the contention based PRACH.

Herein, a beam correspondence is available or held at the UE 101 may mean that the UE 101 is able to determine a UE Tx beam for the uplink (UL) transmission based on UE's downlink (DL) measurement on UE's one or more Rx beams, as defined by the 3rd Generation Partnership Project (3GPP) standards. Detection of a beam failure is based on DL measurements.

In the case that a beam correspondence is available or held at the UE 101, if a DL beam failure occurs, then correspondingly the UL transmission fails too, and thus it may be better to transmit the beam failure recovery request via the non-contention based PRACH than via the PUCCH. Therefore, if a beam correspondence is available or held at the UE 101, the UE 101 may attempt to transmit the beam failure recovery request via the non-contention based PRACH first. If no response is received, the UE 101 may attempt to re-transmit the beam failure recovery request via the non-contention based PRACH for several times or for a certain period, and if no response is received after the attempt, the UE 101 may fall back to the contention based PRACH for transmission of the beam failure recovery request.

However, in the case that no beam correspondence is available at the UE 101, if a DL beam failure occurs, the UE 101 may not know whether the UL transmission still works or not, that is to say, the UL transmission may still work. If the UL transmission still works, then transmission of the beam failure recovery request via the PUCCH may succeed with a high probability, however, if the UL transmission fails too, then transmission of the beam failure recovery request via the PUCCH may fail. Therefore, if no beam correspondence is available at the UE 101, the UE 101 may attempt to transmit the beam failure recovery request via the PUCCH first since the UL transmission may still work. If no response is received, the UE 101 may attempt to re-transmit the beam failure recovery request via the PUCCH for several times or for a certain period, and if no response is received after the attempt, the UE 101 may then re-attempt to transmit the beam failure recovery request via the non-contention based PRACH for several times or for a certain period. If no response is received after the re-attempt, the UE 101 may fall back to the contention based PRACH for transmission of the beam failure recovery request.

In an embodiment, if the channel is determined as the contention based PRACH, the UE 101 may process (e.g., modulate, encode, etc.) a first message (e.g., Msg 3, as defined by the 3GPP standards) for transmission to the AN 111, wherein the first message may include the following information: an identification of the UE 101, information identifying the beam failure recovery request, and a beam quality reporting. It is to be noted that, the contention based PRACH discussed herein is different from the normal or existing contention based PRACH. As an example, if the contention based PRACH discussed herein is used for transmitting the beam failure recovery request, a beam reporting may be included in the first message (e.g., Msg 3) transmitted from the UE 101 to the AN 111, and updated BPL or indicator information for beam indication may be included in a second message (e.g., Msg 4, as defined by the 3GPP standards) transmitted from the AN 111 to the UE 101, which will be described in detail below. As another example, if the contention based PRACH discussed herein is used for transmitting the beam failure recovery request, there is no need to transmit RRCConnectionRequest information in Msg 3, since the UE 101 is still in a RRC_Connected mode, while for the normal contention based PRACH, since the UE 101 is in a RRC_Idle mode, the UE 101 should transmit RRCConnectionRequest information in Msg 3.

In an embodiment, the message may further include one or more beam indexes of one or more new transmit (Tx) beams of the AN 111 if no beam correspondence is available at the UE 101. In an embodiment, the beam quality reporting may be based on a beam grouping or may not be based on a beam grouping, which may be predefined or configured by a higher layer signaling.

The AN 111 may receive the beam failure recovery request transmitted at 215, and process (e.g., demodulate, decode, etc.), at 220, the received beam failure recovery request. In an embodiment, if the beam failure recovery request is received via the contention based PRACH, the AN 111 may determine one or more new BPLs or indicator information for beam indication based on the processed beam failure recovery request, and may process (e.g., modulate, encode, etc.) a second message (e.g., Msg 4, as defined by the 3GPP standards) indicating the one or more new BPLs or the indicator information for transmission to the UE 101 for beam indication. Then the AN 111 may transmit the processed second message to the UE 101 at 225. As discussed previously, the contention based PRACH discussed herein is different from the normal or existing contention based PRACH. As an example, if the contention based PRACH discussed herein is used for transmitting the beam failure recovery request, since current BPL or indicator information for beam indication is not valid anymore, updated BPL or indicator information for beam indication may be included in the second message.

In an embodiment, if the beam failure recovery request is received via the non-contention based PRACH or the contention based PRACH, and if a first set of resources for the non-contention based PRACH or the contention based PRACH are Code Division Multiplexed (CDMed) with a second set of resources for other non-contention based PRACHs or other contention based PRACHs, one or more beams of the AN 111 associated with the first set of resources are the same as one or more beams of the AN 111 associated with the second set of resources. The one or more beams may include one or more beams of the AN 111 for one or more SS blocks or one or more CSI-RSs. In this embodiment, for transmission of the beam failure recovery request via a PRACH (the non-contention based PRACH or the contention based PRACH), one or more PRACH resources which are CDMed with other PRACH resources may be used. In addition, for transmission of the beam failure recovery request via a PRACH, since information regarding one or more new Tx beams of the AN 111 is implicitly indicated by the time and/or frequency of the PRACH, all the CDMed resources should be associated with one or more same beams of the AN 111, such as one or more SS block or CSI-RS beams. Therefore, if the beam failure recovery request is received via a PRACH (the non-contention based PRACH or the contention based PRACH) in a CDM manner, all the CDMed resources should be associated with the one or more same beams of the AN 111, such as one or more SS block or CSI-RS beams.

As discussed previously, transmission of the beam failure recovery request via the non-contention based PRACH requires that one or more resources for the non-contention based PRACH are configured by the AN 111 in advance, since after a beam failure occurs, the DL transmission has failed and thus it is impossible to configure one or more resources for the non-contention based PRACH for the UE 101. In an embodiment, if the beam failure recovery request is received via the non-contention based PRACH, the AN 111 may determine resources for the non-contention based PRACH when a Radio Resource Control (RRC) connection is set up between the AN 111 and the UE 101. In addition, the AN 111 may release the resources when the RRC connection is released or when the UE 101 handovers to another access node (such as the AN 112).

Figure 3:
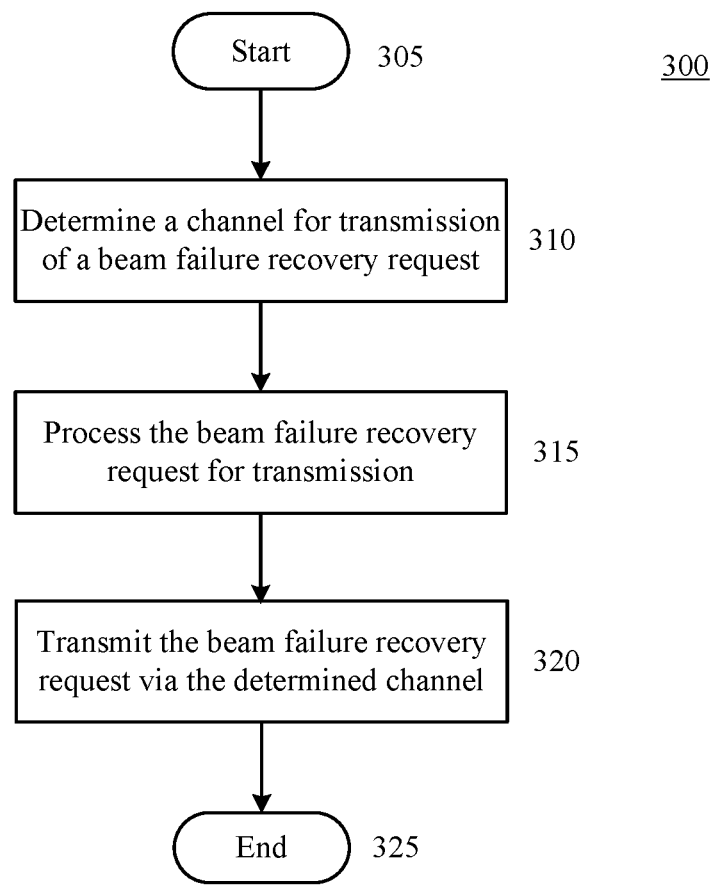
FIG. 3 is a flow chart showing a method performed by a UE for transmission of a beam failure recovery request in accordance with some embodiments of the disclosure.

FIG. 3 is a flow chart showing a method performed by a UE for transmission of a beam failure recovery request in accordance with some embodiments of the disclosure. The operations of FIG. 3 may be used for a UE (e.g., UE 101) to encode a beam failure recovery request for transmission to an AN (e.g., AN 111) of a RAN (e.g., RAN 110) for beam recovery.

The method starts at 305. At 310, the UE 101 may determine, in response to a beam failure, a channel for transmission of a beam failure recovery request as one of: a PUCCH, a non-contention based PRACH, and a contention based PRACH. Then at 315, the UE 101 may process (e.g., modulate, encode, etc.) the beam failure recovery request for transmission to the AN 111 via the determined channel. At 320, the UE 101 may transmit the processed beam failure recovery request to the AN 111 via the determined channel.

In an embodiment, at 310, the UE 101 may determine the channel as the contention based PRACH if no resource is available for the PUCCH and the non-contention based PRACH.

In an embodiment, the UE 101 may determine the channel as the PUCCH at 310, and then encode and transmit the beam failure recovery request to the AN 111 via the PUCCH at 315 and 320 respectively. If no response is received from the AN 111 after transmission of the beam failure recovery request via the PUCCH at 320, the UE 101 may then perform a re-transmission of the beam failure recovery request via the PUCCH. In response to the re-transmission via the PUCCH is performed for a predetermined number or for a predetermined period without receiving a response from the AN 111, the UE 101 may re-determine the channel as one of the contention based PRACH and the non-contention based PRACH, and then perform a transmission of the beam failure recovery request via the re-determined channel. The UE 101 may re-determine the channel as the contention based PRACH if no resource is available for the non-contention based PRACH, and the UE 101 may re-determine the channel as the non-contention based PRACH if there are available resources for the non-contention based PRACH.

In an embodiment, at 310, the UE 101 may determine the channel as the non-contention based PRACH if a beam correspondence is available at the UE 101, and then encode and transmit the beam failure recovery request to the AN 111 via the non-contention based PRACH at 315 and 320 respectively. If no response is received from the AN 111 after transmission of the beam failure recovery request via the non-contention based PRACH at 320, the UE 101 may then perform a re-transmission of the beam failure recovery request via the non-contention based PRACH. In response to the re-transmission via the non-contention based PRACH is performed for a predetermined number or for a predetermined period without receiving a response from the AN 111, the UE 101 may re-determine the channel as the contention based PRACH, and then perform a transmission of the beam failure recovery request via the contention based PRACH.

In another embodiment, at 310, the UE 101 may determine the channel as the PUCCH if no beam correspondence is available at the UE 101, and then encode and transmit the beam failure recovery request to the AN 111 via the PUCCH at 315 and 320 respectively. If no response is received from the AN 111 after transmission of the beam failure recovery request via the PUCCH at 320, the UE 101 may then perform a re-transmission of the beam failure recovery request via the PUCCH. In response to the re-transmission via the PUCCH is performed for a predetermined number or for a predetermined period without receiving a response from the AN 111, the UE 101 may re-determine the channel as the non-contention based PRACH, and then perform a transmission of the beam failure recovery request via the non-contention based PRACH. If no response is received from the AN 111 after transmission of the beam failure recovery request via the non-contention based PRACH, the UE 101 may then perform a re-transmission of the beam failure recovery request via the non-contention based PRACH. In response to the re-transmission via the non-contention based PRACH is performed for a predetermined number or for a predetermined period without receiving a response from the AN 111, the UE 101 may re-determine the channel as the contention based PRACH, and then perform a transmission of the beam failure recovery request via the contention based PRACH.

For the sake of brevity, some embodiments which have already been described with reference to FIG. 2 in detail will not be repeated. The method ends at 325.

Figure 4:
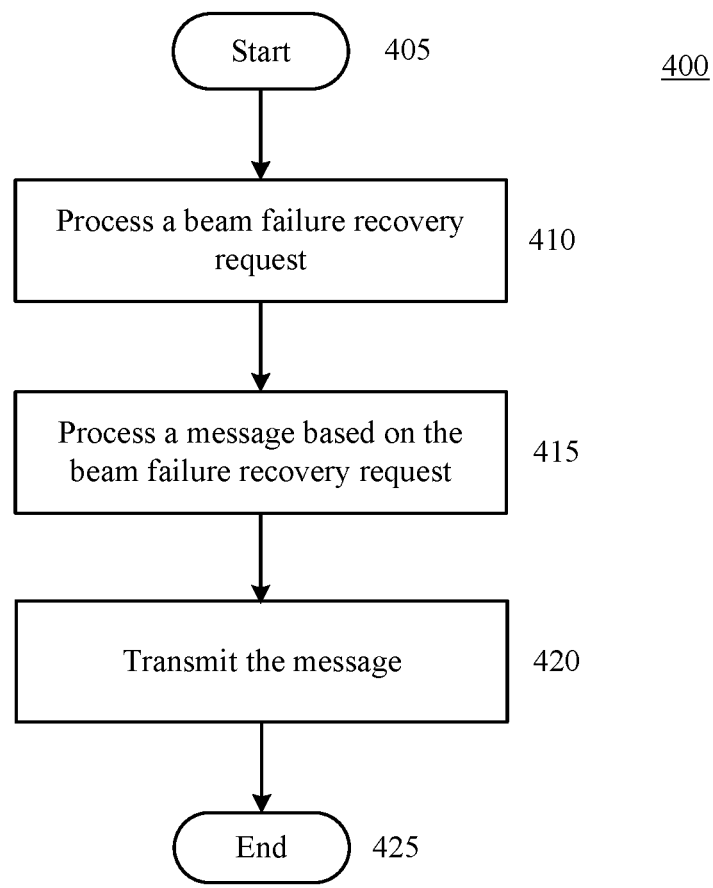
FIG. 4 is a flow chart showing a method performed by an access node for beam recovery in accordance with some embodiments of the disclosure.

FIG. 4 is a flow chart showing a method performed by an access node for beam recovery in accordance with some embodiments of the disclosure. The operations of FIG. 4 may be used for an AN (e.g., AN 111) of a RAN (e.g., RAN 110) to decode a beam failure recovery request from a UE (e.g., UE 101) for beam recovery.

The method starts at 405. At 410, the AN 111 may process (e.g., demodulate, decode, etc.) a beam failure recovery request received from the UE 101 via one of: a PUCCH, a non-contention based PRACH, and a contention based PRACH. At 415, if the beam failure recovery request is received via the contention based PRACH, the AN 111 may determine one or more new BPLs or indicator information for beam indication based on the processed beam failure recovery request, and may process (e.g., modulate, encode, etc.) a message (e.g., Msg 4, as defined by the 3GPP standards) indicating the one or more new BPLs or the indicator information for transmission to the UE 101 for beam indication. Then the AN 111 may transmit the processed message to the UE 101 at 420.

For the sake of brevity, some embodiments which have already been described with reference to FIG. 2 in detail will not be repeated. The method ends at 425.

Figure 5:
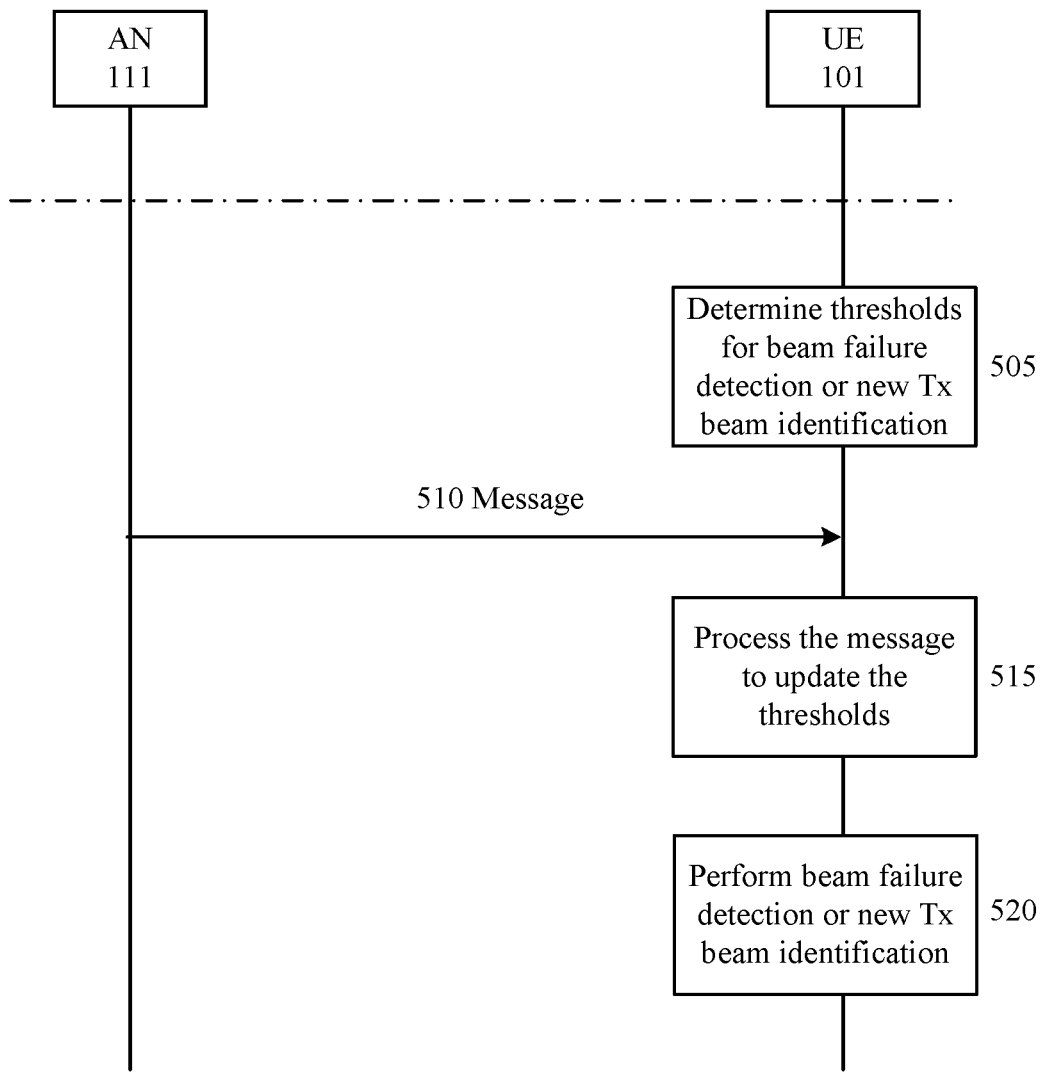
FIG. 5 is a flow chart showing operations for beam failure detection or new Tx beam identification in accordance with some embodiments of the disclosure.

FIG. 5 is a flow chart showing operations for beam failure detection or new Tx beam identification in accordance with some embodiments of the disclosure. The operations of FIG. 5 may be used for a UE (e.g., UE 101) to perform beam failure detection or new Tx beam identification.

At 505, the UE 101 may determine a first threshold for beam failure detection of a first beam of the AN 111 for a RS. In an embodiment, the RS may be an SS block or a CSI-RS.

The AN 111 may process (e.g., modulate, encode, etc.) a message, and then transmit at 510 the processed message to the UE 101, wherein the message may identify one of: a first power offset for the first beam, and a second threshold for beam failure detection of the first beam. In an embodiment, the message may be transmitted via a dedicated signaling or a broadcast.

At 505, the UE 101 may also determine a third threshold for identifying whether a second beam of the AN 111 for the RS is a new Tx beam of the AN 111. The message may further identify one of: a second power offset for the second beam, and a fourth threshold for identifying whether the second beam is a new Tx beam.

The UE 101 may receive the message transmitted at 510, and then process (e.g., modulate, encode, etc.), at 515, the received message to update the first threshold based on the message. In an embodiment, if the message identifies the first power offset, the updated first threshold is based on the first threshold and the first power offset. For example, if the first threshold for beam failure detection of the first beam is $T_1$, and the first power offset identified by the message is X dB, then the updated first threshold for beam failure detection of the first beam may be $T_1+X$. In another embodiment, if the message identifies the second threshold, the updated first threshold may be equal to the second threshold. For example, if the first threshold for beam failure detection of the first beam is $T_1$, and the second threshold identified by the message is $T_2$, then the updated first threshold for beam failure detection of the first beam may be $T_2$.

The UE 101 may also process (e.g., modulate, encode, etc.), at 515, the received message to update the third threshold based on the message. In an embodiment, if the message further identifies the second power offset, the updated third threshold may be based on the third threshold and the second power offset. For example, if the third threshold for identifying whether the second beam is a new Tx beam is $T_3$, and the second power offset identified by the message is Y dB, then the updated third threshold for identifying whether the second beam is a new Tx beam may be $T_3+Y$. In another embodiment, if the message further identifies the fourth threshold, the updated third threshold may be equal to the fourth threshold. For example, if the third threshold for identifying whether the second beam is a new Tx beam is $T_3$, and the fourth threshold identified by the message is $T_4$ dB, then the updated third threshold for identifying whether the second beam is a new Tx beam may be $T_4$.

Alternatively, in some embodiments, the UE 101 may not need to determine the first threshold for beam failure detection of the first beam at 505. The AN 111 may process (e.g., modulate, encode, etc.) a message, and then transmit at 510 the processed message to the UE 101, wherein the message may identify a threshold for beam failure detection of the first beam. Then the UE 101 may receive the message, and perform beam failure detection of the first beam directly based on the threshold identified by the message. That is to say, the UE 101 may directly apply the threshold identified by the message for beam failure detection of the first beam.

Similarly, in some embodiments, the UE 101 may not need to determine the third threshold for identifying whether the second beam is a new Tx beam at 505. The AN 111 may process (e.g., modulate, encode, etc.) a message, and then transmit at 510 the processed message to the UE 101, wherein the message may identify a threshold for identifying whether the second beam is a new Tx beam. Then the UE 101 may receive the message, and identify whether the second beam is a new Tx beam directly based on the threshold identified by the message. That is to say, the UE 101 may directly apply the threshold identified by the message for identifying whether the second beam is a new Tx beam.

At 520, the UE 101 may perform beam failure detection of the first beam based on the updated first threshold, or may identify whether the second beam is a new Tx beam based on the updated third threshold.

In an embodiment, the UE 101 may determine first beam quality of the first beam, and determine whether a beam failure occurs based on the first beam quality and the updated first threshold. In response to the first beam quality being below the updated first threshold, the UE 101 may determine a beam failure occurs. The first beam quality may be determined by measuring one of a Reference Signal Receiving Power (RSRP), a Reference Signal Receiving Quality (RSRQ), and a Signal to Interference plus Noise Ratio (SINR) of the first beam.

In an embodiment, the UE 101 may determine second beam quality of the second beam, and identify whether the second beam is a new Tx beam based on the second beam quality and the updated third threshold. In response to the second beam quality being above the updated third threshold, the UE 101 may identify the second beam as a new Tx beam. The second beam quality may be determined by measuring one of a RSRP, a RSRQ, and a SINR of the second beam.

Alternatively, in some embodiments, whether a beam failure occurs may be determined by a hypothetical Block Error Rate (BLER) of a PDCCH, and may also be determined by an EPRE ratio between an SS Block or CSI-RS which is spatially QCLed with the PDCCH and a Demodulation Reference Signal (DMRS) of the PDCCH or the whole PDCCH, which may be configured by a higher layer signaling or may be predefined.

Therefore, different Tx beams of the AN 111 may be transmitted with different Tx power, that is to say, different EPRE settings or configurations may be applied to different beams the AN 111 (such as SS Block beams or CSI-RS beams). The AN 111 may transmit the EPRE settings or configurations for different beams to the UE 101, so that the UE 101 may update or determine thresholds for beam failure detection and/or new Tx beam identification based on the EPRE settings or configurations.

Figure 6:
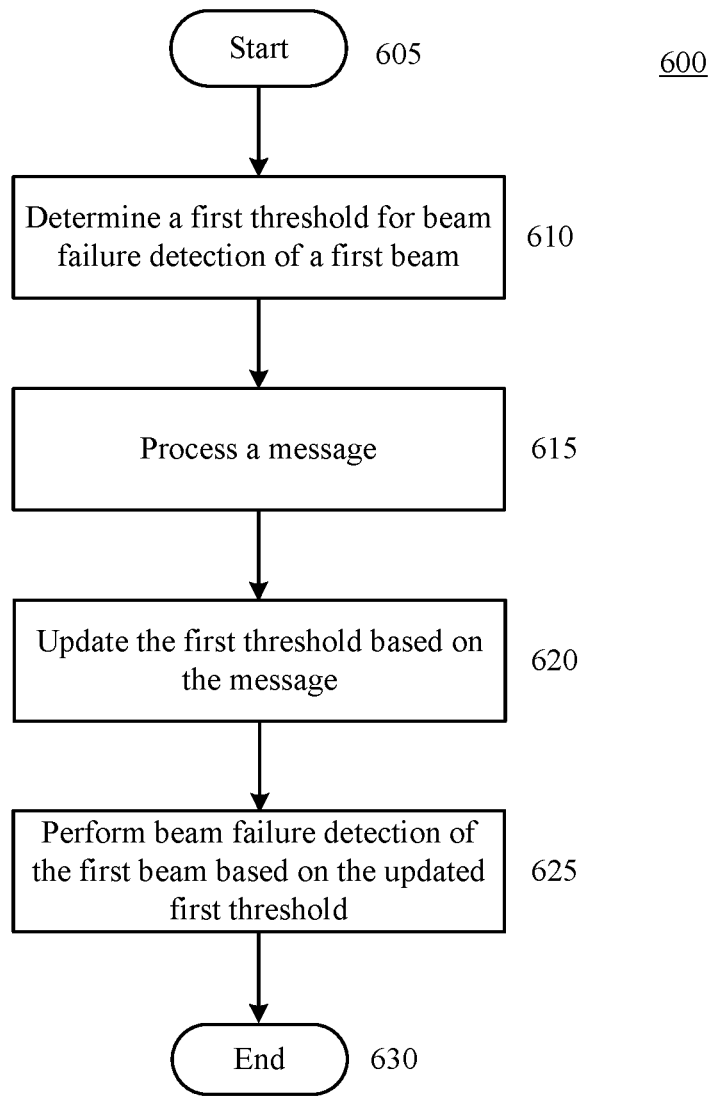
FIG. 6 is a flow chart showing a method performed by a UE for beam failure detection or new Tx beam identification in accordance with some embodiments of the disclosure.

FIG. 6 is a flow chart showing a method performed by a UE for beam failure detection or new Tx beam identification in accordance with some embodiments of the disclosure. The operations of FIG. 6 may be used for a UE (e.g., UE 101) to perform beam failure detection or new Tx beam identification.

The method starts at 605. At 610, the UE 101 may determine a first threshold for beam failure detection of a first beam of the AN 111 for a RS. In an embodiment, the RS may be an SS block or a CSI-RS. At 615, the UE 101 may process (e.g., modulate, encode, etc.) a message received from the AN 111, wherein the message may identify one of: a first power offset for the first beam, and a second threshold for beam failure detection of the first beam.

In addition, at 610, the UE 101 may also determine a third threshold for identifying whether a second beam of the AN 111 for the RS is a new Tx beam of the AN 111. The message processed at 615 may further identify one of: a second power offset for the second beam, and a fourth threshold for identifying whether the second beam is a new Tx beam.

At 620, the UE 101 may update the first threshold based on the processed message. In an embodiment, if the message identifies the first power offset, the updated first threshold is based on the first threshold and the first power offset. For example, if the first threshold for beam failure detection of the first beam is $T_1$, and the first power offset identified by the message is X dB, then the updated first threshold for beam failure detection of the first beam may be $T_1+X$. In another embodiment, if the message identifies the second threshold, the updated first threshold may be equal to the second threshold. For example, if the first threshold for beam failure detection of the first beam is $T_1$, and the second threshold identified by the message is $T_2$, then the updated first threshold for beam failure detection of the first beam may be $T_2$.

In addition, at 620, the UE 101 may also update the third threshold based on the processed message. In an embodiment, if the message further identifies the second power offset, the updated third threshold may be based on the third threshold and the second power offset. For example, if the third threshold for identifying whether the second beam is a new Tx beam is $T_3$, and the second power offset identified by the message is Y dB, then the updated third threshold for identifying whether the second beam is a new Tx beam may be $T_3+Y$. In another embodiment, if the message further identifies the fourth threshold, the updated third threshold may be equal to the fourth threshold. For example, if the third threshold for identifying whether the second beam is a new Tx beam is $T_3$, and the fourth threshold identified by the message is $T_4$ dB, then the updated third threshold for identifying whether the second beam is a new Tx beam may be $T_4$.

Alternatively, in some embodiments, the UE 101 may not need to determine the first threshold for beam failure detection of the first beam at 610, that is to say, operations at 610 may be omitted. The UE 101 may directly process (e.g., modulate, encode, etc.) a message received from the AN 111, wherein the message may identify a threshold for beam failure detection of the first beam. Then the UE 101 may perform beam failure detection of the first beam directly based on the threshold identified by the message. That is to say, the UE 101 may directly apply the threshold identified by the message for beam failure detection of the first beam.

Similarly, in some embodiments, the UE 101 may not need to determine the third threshold for identifying whether the second beam is a new Tx beam at 610, that is to say, operations at 610 may be omitted. The UE 101 may directly process (e.g., modulate, encode, etc.) a message received from the AN 111, wherein the message may identify a threshold for identifying whether the second beam is a new Tx beam. Then the UE 101 may identify whether the second beam is a new Tx beam directly based on the threshold identified by the message. That is to say, the UE 101 may directly apply the threshold identified by the message for identifying whether the second beam is a new Tx beam.

At 625, the UE 101 may perform beam failure detection of the first beam based on the updated first threshold, or may identify whether the second beam is a new Tx beam based on the updated third threshold. In an embodiment, the UE 101 may determine first beam quality of the first beam, and determine whether a beam failure occurs based on the first beam quality and the updated first threshold. In response to the first beam quality being below the updated first threshold, the UE 101 may determine a beam failure occurs. The first beam quality may be determined by measuring one of a Reference Signal Receiving Power (RSRP), a Reference Signal Receiving Quality (RSRQ), and a Signal to Interference plus Noise Ratio (SINR) of the first beam. In an embodiment, the UE 101 may determine second beam quality of the second beam, and identify whether the second beam is a new Tx beam based on the second beam quality and the updated third threshold. In response to the second beam quality being above the updated third threshold, the UE 101 may identify the second beam as a new Tx beam. The second beam quality may be determined by measuring one of a RSRP, a RSRQ, and a SINR of the second beam.

For the sake of brevity, some embodiments which have already been described with reference to FIG. 5 in detail will not be repeated. The method ends at 630.

Figure 7:
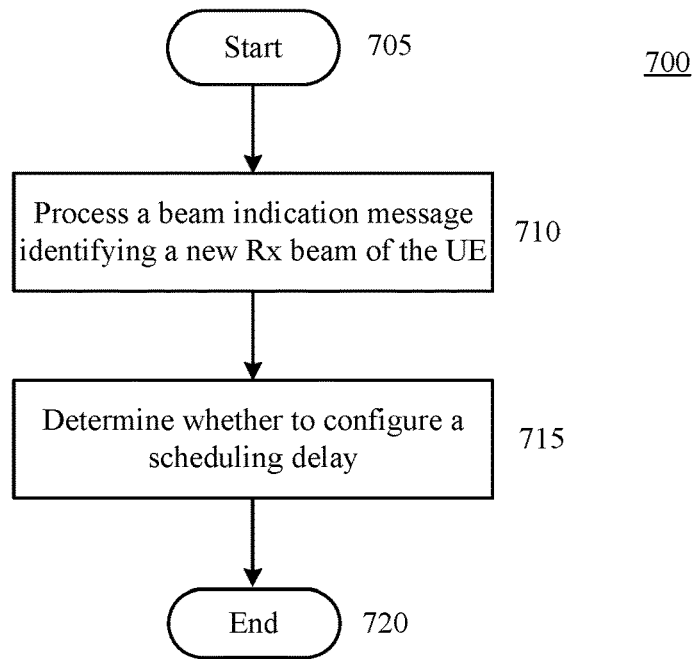
FIG. 7 is a flow chart showing a method performed by an access node for determining whether to configure a scheduling delay between a PDCCH and a PDSCH in accordance with some embodiments of the disclosure.

FIG. 7 is a flow chart showing a method performed by an access node for determining whether to configure a scheduling delay between a PDCCH and a PDSCH in accordance with some embodiments of the disclosure. The operations of FIG. 7 may be used for an AN (e.g., AN 111) of a RAN (e.g., RAN 110) to determine whether to configure a scheduling delay between a PDCCH and a PDSCH.

The method starts at 705. At 710, the AN 111 may process (e.g., modulate, encode, etc.) a beam indication message for transmission via a PDCCH to the UE 101, wherein the beam indication message may identify a new Rx beam of the UE 101 for reception of data via a PDSCH associated with the PDCCH. Then at 715, the AN 111 may determine, based on the beam indication message, whether to configure a scheduling delay between the PDCCH and the PDSCH.

In an embodiment, the AN 111 may determine to configure no scheduling delay between the PDCCH and the PDSCH in response to the new Rx beam is the same as a current Rx beam of the UE 101. That is to say, if the Rx beam of the UE 101 for processing the PDSCH (namely, the new Rx beam) is the same as the Rx beam of the UE 101 for processing the PDCCH (namely, the current Rx beam), the AN 111 may schedule the PDSCH right after the PDCCH. After processing the PDCCH (such as demodulation of the PDCCH), the UE 101 may continue to use the same Rx beam as used for processing the PDCCH to process the PDSCH.

Figure 9:
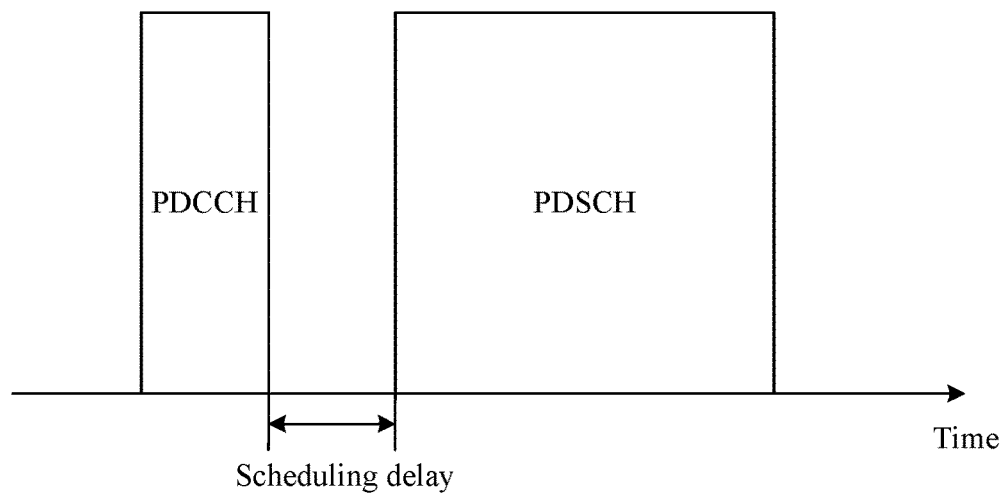
FIG. 9 is an illustration of a scheduling delay between a PDCCH and a PDSCH in accordance with some embodiments of the disclosure.

In another embodiment, the AN 111 may determine to configure a scheduling delay between the PDCCH and the PDSCH (e.g., as shown in FIG. 9) in response to the new Rx beam is different from a current Rx beam of the UE 101. The scheduling delay may include a processing delay for processing the PDCCH at the UE 101 and a switching delay for switching from the current Rx beam to the new Rx beam at the UE 101. Alternatively, the scheduling delay may be predefined or configured by a higher layer signaling, or may be determined based on a capability of the UE 101. The method ends at 720.

Figure 8:
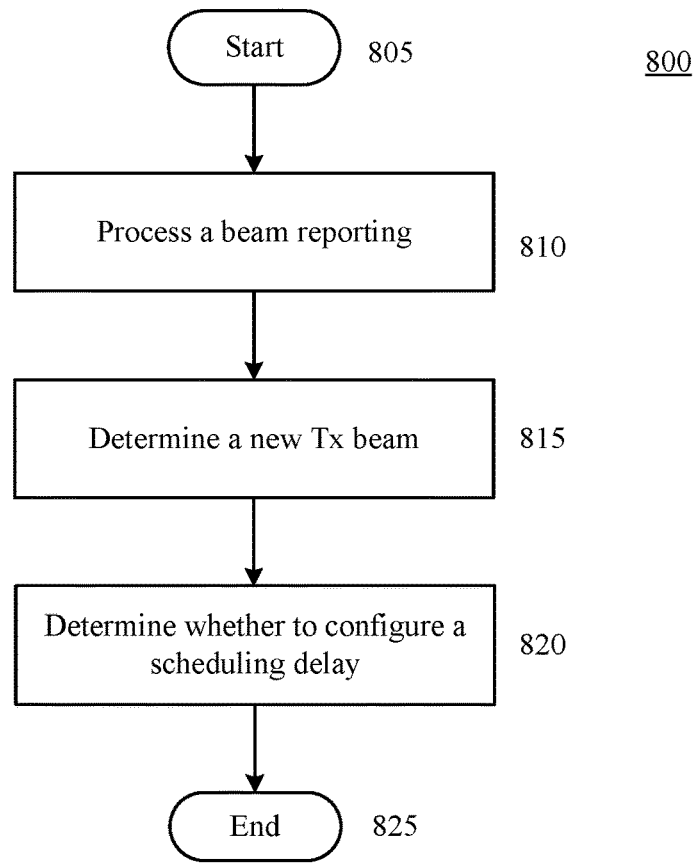
FIG. 8 is a flow chart showing another method performed by an access node for determining whether to configure a scheduling delay between a PDCCH and a PDSCH in accordance with some embodiments of the disclosure.

FIG. 8 is a flow chart showing another method performed by an access node for determining whether to configure a scheduling delay between a PDCCH and a PDSCH in accordance with some embodiments of the disclosure. The operations of FIG. 8 may be used for an AN (e.g., AN 111) of a RAN (e.g., RAN 110) to determine whether to configure a scheduling delay between a PDCCH and a PDSCH.

The method starts at 805. At 810, the AN 111 may process (e.g., modulate, encode, etc.) a beam reporting received from the UE 101, wherein the beam reporting may identify: one or more Tx beams of the AN 111; and a tag, for each of the one or more Tx beams, indicating a Rx beam of the UE 101 associated with the Tx beam. In an embodiment, for each of the one or more Tx beams, the tag may be a Rx beam index corresponding to the Rx beam of the UE 101 associated with the Tx beam. The range of values of the tag may be based on an actual amount of Rx beams of the UE 101. Alternatively, the range of values of the tag may be based on an amount of Rx beams of the UE 101 associated with all Tx beams of the AN 111 to reduce overhead. For example, if the UE 101 has 27 Rx beams, then the values of the tag may range from 0 to 26. In addition, in order to save overhead, the tag may be based on logical Rx beams of the UE 101, for example, if the Tx beams to be reported in the beam reporting are associated with 4 Rx beams of the UE 101, then the values of the tag may range from 0 to 3.

At 815, the AN 111 may determine a new Tx beam among the one or more Tx beams based on the beam reporting. In an embodiment, the beam reporting may also identify beam quality of the one or more Tx beams, and the AN 111 may choose a new Tx beam among the one or more Tx beams based on the beam quality.

At 820, the AN 111 may determine, based on the beam reporting and the new Tx beam, whether to configure a scheduling delay between the PDCCH and the PDSCH.

In an embodiment, if the tag for the new Tx beam indicates a Rx beam which is the same as a current Rx beam of the UE 101, the AN 111 may determine to configure no scheduling delay between the PDCCH and the PDSCH. That is to say, if a Rx beam of the UE 101 for processing the PDSCH is the same as a current Rx beam of the UE 101 for processing the PDCCH, the AN 111 may schedule the PDSCH immediately after the PDCCH, namely, the scheduling delay is not necessary and data transmission via the PDSCH may be immediately after the PDCCH. After processing the PDCCH (such as decoding and processing control information), the UE 101 may continue to use the same Rx beam as used for processing the PDCCH to process the PDSCH.

In another embodiment, if the tag for the new Tx beam indicates a Rx beam which is different from a current Rx beam of the UE 101, the AN 111 may determine to configure a scheduling delay between the PDCCH and the PDSCH (e.g., as shown in FIG. 9). As discussed previously, the scheduling delay may include a processing delay for processing the PDCCH at the UE 101 and a switching delay for switching from the current Rx beam to a new Rx beam at the UE 101. Alternatively, the scheduling delay may be predefined or configured by a higher layer signaling, or may be determined based on a capability of the UE 101. The method ends at 825.

Figure 10:
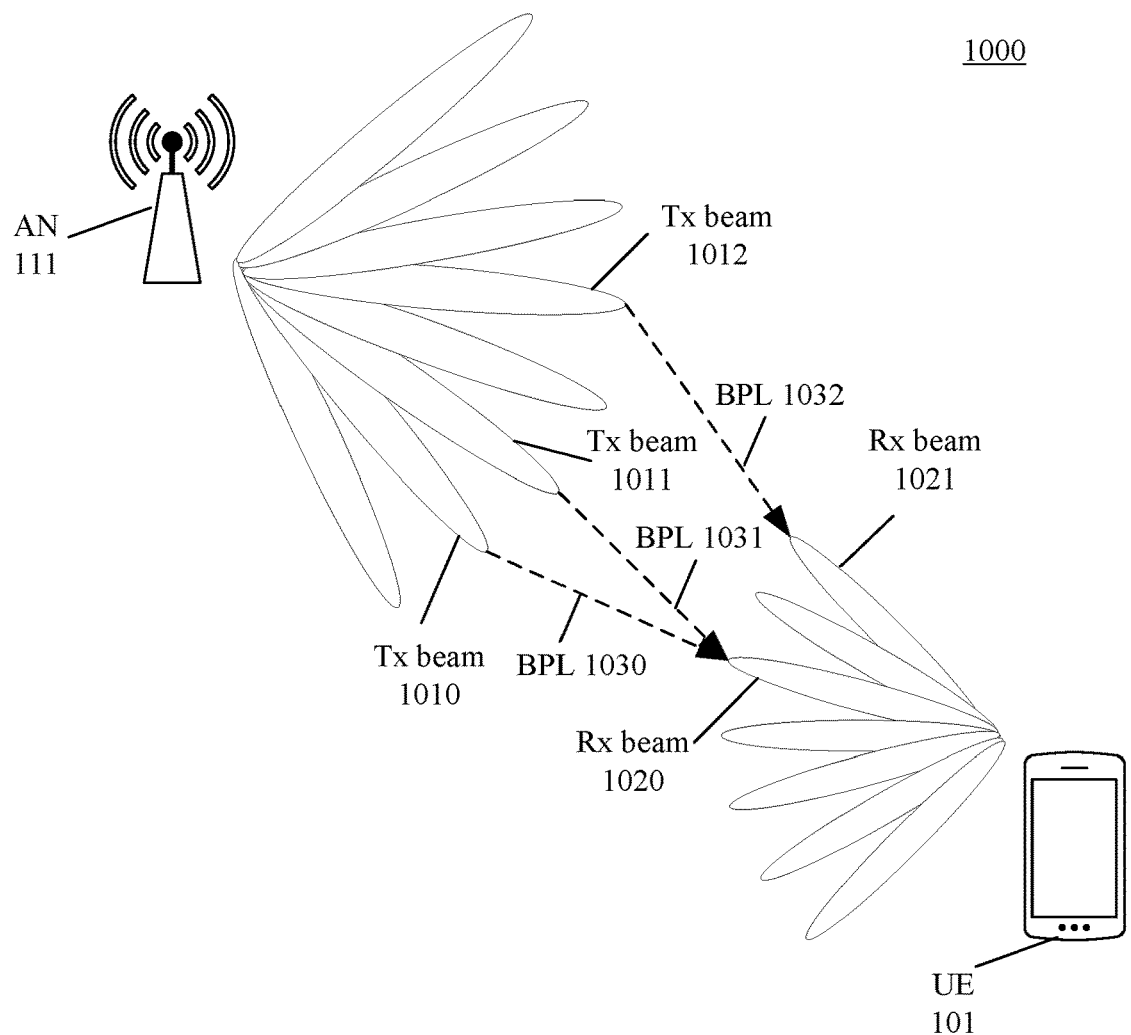
FIG. 10 is an illustration of one or more Tx beams of the AN 111 and one or more Rx beams of the UE 101 and in accordance with some embodiments of the disclosure.

FIG. 10 is an illustration of one or more Tx beams of the AN 111 and one or more Rx beams of the UE 101 and in accordance with some embodiments of the disclosure. In the example of FIG. 10, the AN 111 may maintain one or more Tx beams including a Tx beam 1410, a Tx beam 1011 and a Tx beam 1412, and the UE 101 may maintain one or more Rx beams including a Rx beam 1020 and a Rx beam 1021. There may be one or more BPLs between the AN 111 and UE 101, wherein each of the BPLs may be formed by a Tx beam of the AN 111 and a Rx beam of the UE 101. For example, as shown in FIG. 10, a BPL 1030 may be formed by the Tx beam 1410 of the AN 111 and the Rx beam 1020 of the UE 101, a BPL 1031 may be formed by the Tx beam 1011 of the AN 111 and the Rx beam 1020 of the UE 101, and a BPL 1032 may be formed by the Tx beam 1412 of the AN 111 and the Rx beam 1021 of the UE 101.

As an example for illustration of a scheduling delay only, it is assumed that a current active BPL is the BPL 1031 (namely, a current Tx beam is 1011 and a current Rx beam is 1020). If the AN 111 decides to switch to the BPL 1030 (namely, a new Tx beam is 1410 and a new Rx beam is 1020), then the scheduling delay is not necessary since the new Rx beam remains the same as the current Rx beam (namely, an actual Rx beam of the UE 101 will not change). However, if the AN 111 decides to switch to the BPL 1032 (namely, a new Tx beam is 1412 and a new Rx beam is 1021), then the AN 111 should configure a scheduling delay since the new Rx beam is different from the current Rx beam (namely, an actual Rx beam of the UE 101 will change).

It should be understood that, the number of Tx beams of the AN 111, Rx beams of the UE 101 and/or BPLs between the AN 111 and the UE 101 illustrated in FIG. 10 is provided for explanatory purposes only and is not limited herein.

Figure 11:
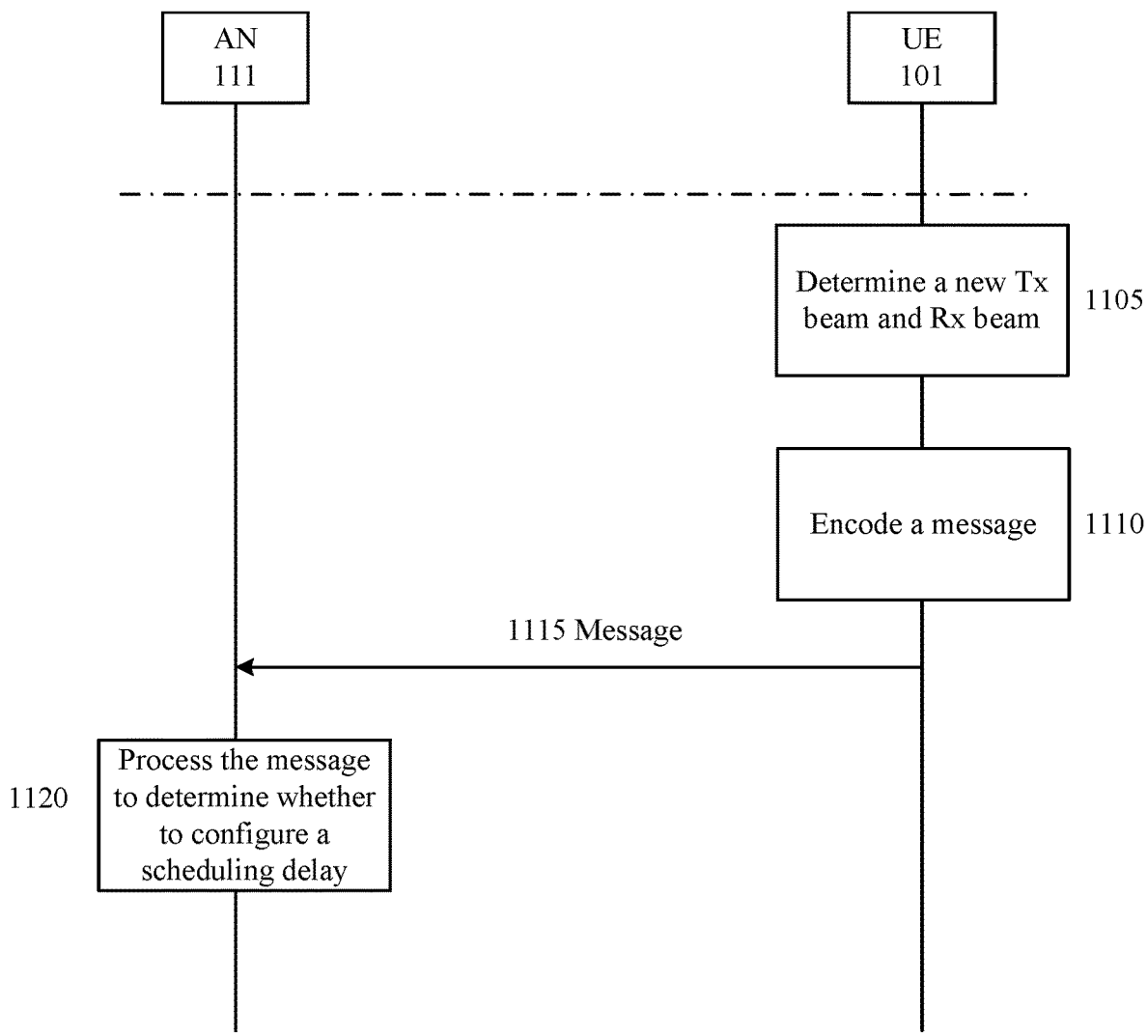
FIG. 11 is a flow chart showing operations for determining whether to configure a scheduling delay between a PDCCH and a PDSCH in accordance with some embodiments of the disclosure.

FIG. 11 is a flow chart showing operations for determining whether to configure a scheduling delay between a PDCCH and a PDSCH in accordance with some embodiments of the disclosure. The operations of FIG. 11 may be used for a UE (e.g., UE 101) to assist an AN (e.g., AN 111) of a RAN (e.g., RAN 110) to determine whether to configure a scheduling delay between a PDCCH and a PDSCH.

At 1105, the UE 101 may determine a new Tx beam of the AN 111 based on one or more RSs received from the AN 111, and determine a new Rx beam of the UE 101 associated with the new Tx beam. In an embodiment, the RSs may be one or more SS blocks or one or more CSI-RSs. The UE 101 may determine beam quality for each of one or more beams for the RSs by measuring one of a RSRP, a RSRQ, and a SINR of the beam, and then choose the new Tx beam based on the beam quality.

At 1110, the UE 101 may then process (e.g., modulate, encode, etc.) a message for transmission to the AN 111 based on the new Rx beam and a current Rx beam, wherein the message is for indicating to the AN 111 whether to configure a scheduling delay between a PDCCH for transmission from the AN 111 to the UE and a PDSCH associated with the PDCCH for transmission from the AN 111 to the UE. In an embodiment, the message may include a one-bit indicator. The one-bit indicator may be set to 0 if the new Rx beam is the same as the current Rx beam. Alternatively, the one-bit indicator may be set to 1 if the new Rx beam is different from the current Rx beam.

The UE 101 may transmit the processed message at 1115. The AN 111 may receive the message transmitted at 1115, and may process (e.g., demodulate, decode, etc.), at 1120, the received message to determine whether to configure a scheduling delay between the PDCCH and the PDSCH based on the processed message. In an embodiment, the AN 111 may determine to configure no scheduling delay between the PDCCH and the PDSCH if the one-bit indicator included in the message is set to 0. Alternatively, the AN 111 may determine to configure a scheduling delay between the PDCCH and the PDSCH if the one-bit indicator is set to 1. The scheduling delay may be predefined or configured by a higher layer signaling, or may be determined based on a capability of the UE 101.

In addition, in some embodiments, the message or the one-bit indicator may not be explicitly transmitted or reported to the AN 111. For example, it may be determined by whether beams states of several Tx beams are reported at the same time instance. If beams states of several Tx beams are reported at the same time instance, it may mean that these Tx beams are associated with the same Rx beam of the UE 101. In this case, it may implicitly indicate to the AN 111 that switching among these Tx beams doesn't require any scheduling delay, and thus the message or the one-bit indicator may not be explicitly transmitted or reported to the AN 111.

In addition, in some embodiments, if the AN 111 requires no scheduling delay exists between the PDCCH and the PDSCH, the UE may transmit a beam reporting to the AN 111 based on a current Rx beam.

Figure 12:
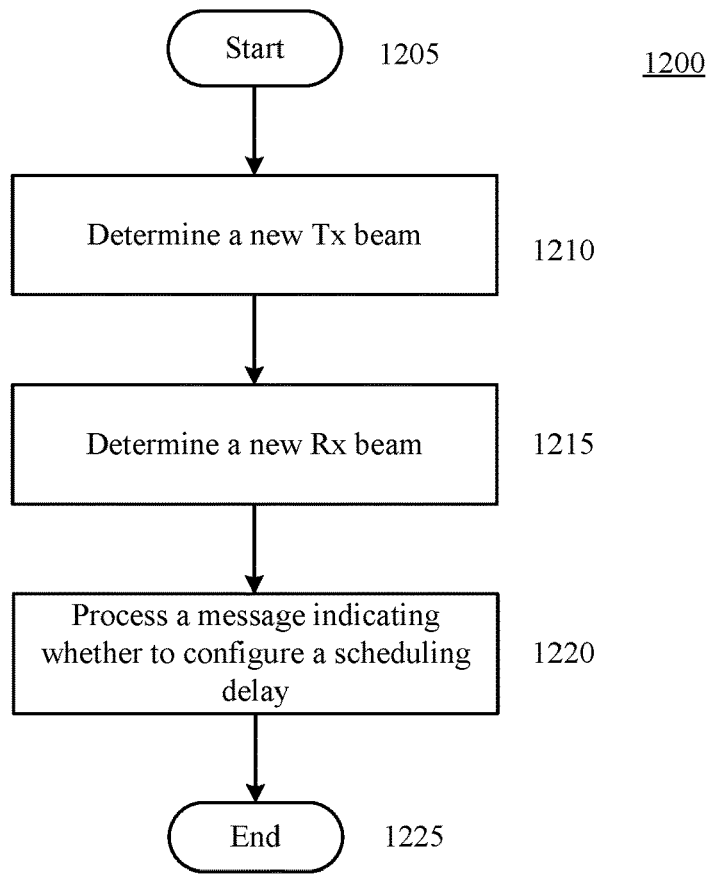
FIG. 12 is a flow chart showing a method performed by a UE for indicating to an access node whether to configure a scheduling delay between a PDCCH and a PDSCH in accordance with some embodiments of the disclosure.

FIG. 12 is a flow chart showing a method performed by a UE for indicating to an access node whether to configure a scheduling delay between a PDCCH and a PDSCH in accordance with some embodiments of the disclosure. The operations of FIG. 12 may be used for a UE (e.g., UE 101) to assist an AN (e.g., AN 111) of a RAN (e.g., RAN 110) to determine whether to configure a scheduling delay between a PDCCH and a PDSCH.

The method starts at 1205. The UE 101 may determine a new Tx beam of the AN 111 based on one or more RSs received from the AN 11 at 1210. In an embodiment, the RSs may be one or more SS blocks or one or more CSI-RSs. The UE 101 may determine beam quality for each of one or more beams for the RSs by measuring one of a RSRP, a RSRQ, and a SINR of the beam, and then choose the new Tx beam based on the beam quality. The UE 101 may determine a new Rx beam of the UE 101 associated with the new Tx beam at 1215.

At 1220, the UE 101 may then process (e.g., modulate, encode, etc.) a message for transmission to the AN 111 based on the new Rx beam and a current Rx beam, wherein the message is for indicating to the AN 111 whether to configure a scheduling delay between a PDCCH for transmission from the AN 111 to the UE and a PDSCH associated with the PDCCH for transmission from the AN 111 to the UE. In an embodiment, the message may include a one-bit indicator. If the new Rx beam is the same as the current Rx beam, the one-bit indicator may be set to 0 to indicate the AN 111 to configure a scheduling delay between the PDCCH and the PDSCH. Alternatively, if the new Rx beam is different from the current Rx beam, the one-bit indicator may be set to 1 to indicate the AN 111 to configure no scheduling delay between the PDCCH and the PDSCH. The method ends at 1225.

Figure 13:
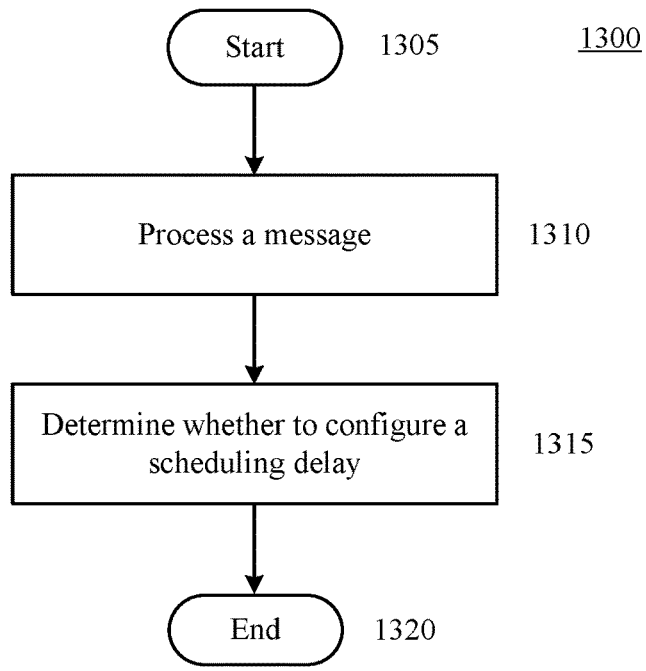
FIG. 13 is a flow chart showing a method performed by an access node for determining whether to configure a scheduling delay between a PDCCH and a PDSCH in accordance with some embodiments of the disclosure.

FIG. 13 is a flow chart showing a method performed by an access node for determining whether to configure a scheduling delay between a PDCCH and a PDSCH in accordance with some embodiments of the disclosure. The operations of FIG. 13 may be used for an AN (e.g., AN 111) of a RAN (e.g., RAN 110) to determine whether to configure a scheduling delay between a PDCCH and a PDSCH.

The method starts at 1305. At 1710, the AN 111 may process (e.g., modulate, encode, etc.) a message received from the UE 101. Then at 1315, the AN 111 may determine whether to configure a scheduling delay between a PDCCH for transmission to the UE 101 and a PDSCH associated with the PDCCH for transmission to the UE 101 based on the processed message. In an embodiment, the message may include a one-bit indicator. The AN 111 may determine to configure no scheduling delay between the PDCCH and the PDSCH if the one-bit indicator is set to 0. Alternatively, the AN 111 may determine to configure a scheduling delay between the PDCCH and the PDSCH if the one-bit indicator is set to 1. The scheduling delay may be predefined or configured by a higher layer signaling, or may be determined based on a capability of the UE 101. The method ends at 1720.

Figure 14:
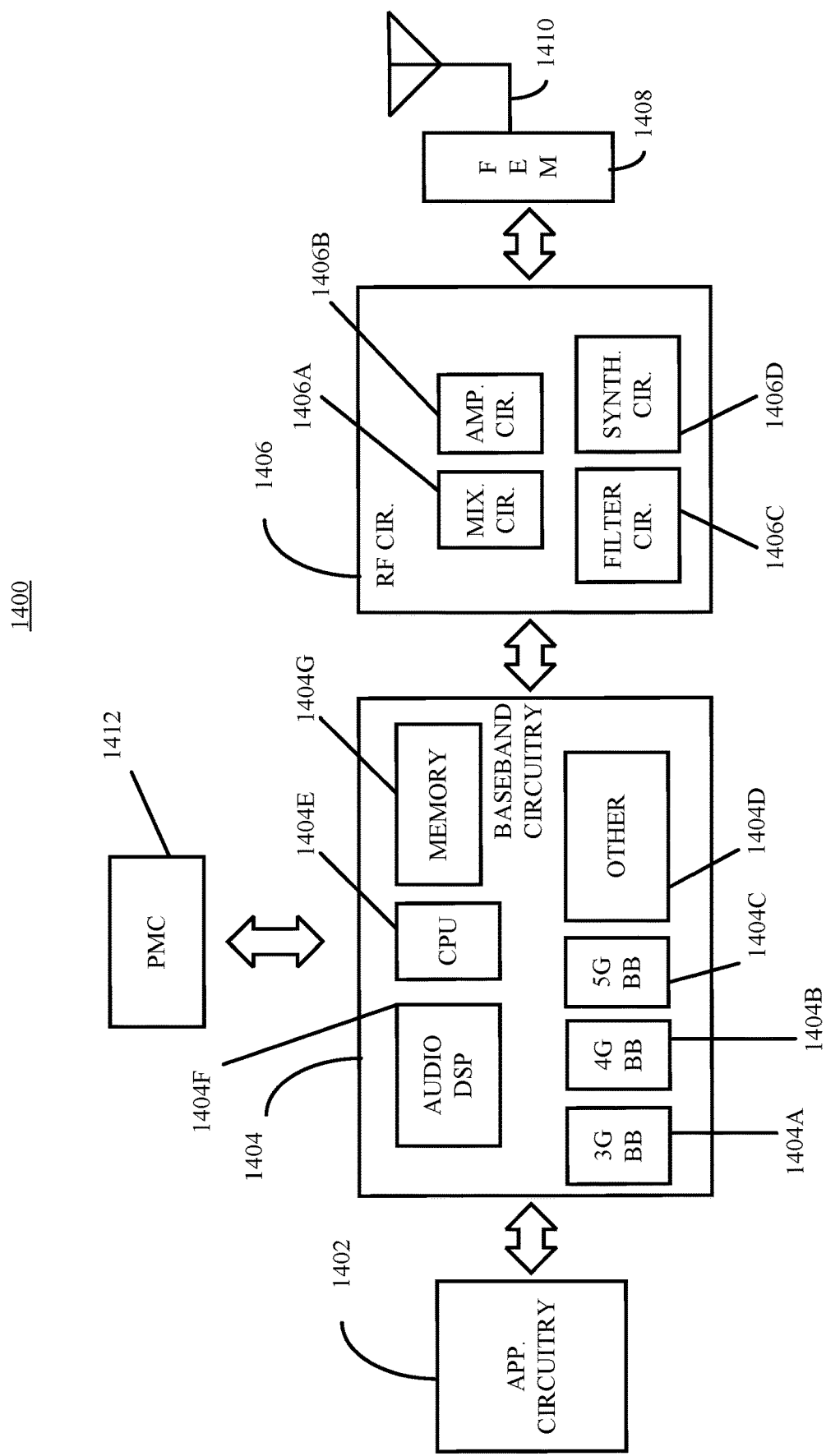
FIG. 14 illustrates example components of a device in accordance with some embodiments of the disclosure.

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or an AN. In some embodiments, the device 1400 may include less elements (e.g., an AN may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404A, a fourth generation (4G) baseband processor 1404B, a fifth generation (5G) baseband processor 1404C, or other baseband processor(s) 1404D for other existing generations, generations in development or to be developed in the future (e.g., second generation (2G), sixth generation (6G), etc.). The baseband circuitry 1404 (e.g., one or more of baseband processors 1404A-D) may handle various radio control functions that enable communication with one or more radio networks via the RF circuitry 1406. In other embodiments, some or all of the functionality of baseband processors 1404A-D may be included in modules stored in the memory 1404G and executed via a Central Processing Unit (CPU) 1404E. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404F. The audio DSP(s) 1404F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406a, amplifier circuitry 1406b and filter circuitry 1406c. In some embodiments, the transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c.

In some embodiments, the mixer circuitry 1406a of the receive signal path and the mixer circuitry 1406a of the transmit signal path may include two or more mixers and may be arranged for quadrature downconversion and upconversion, respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406*d* may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406*d* of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM 1408, or in both the RF circuitry 1406 and the FEM 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 1412 may be additionally or alternatively coupled with, and perform similar power management operations for, other components such as, but not limited to, application circuitry 1402, RF circuitry 1406, or FEM 1408.

In some embodiments, the PMC 1412 may control, or otherwise be part of, various power saving mechanisms of the device 1400. For example, if the device 1400 is in an RRC_Connected state, where it is still connected to the AN as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer, Layer 1 may comprise a physical (PHY) layer of a UE/AN.

Figure 15:
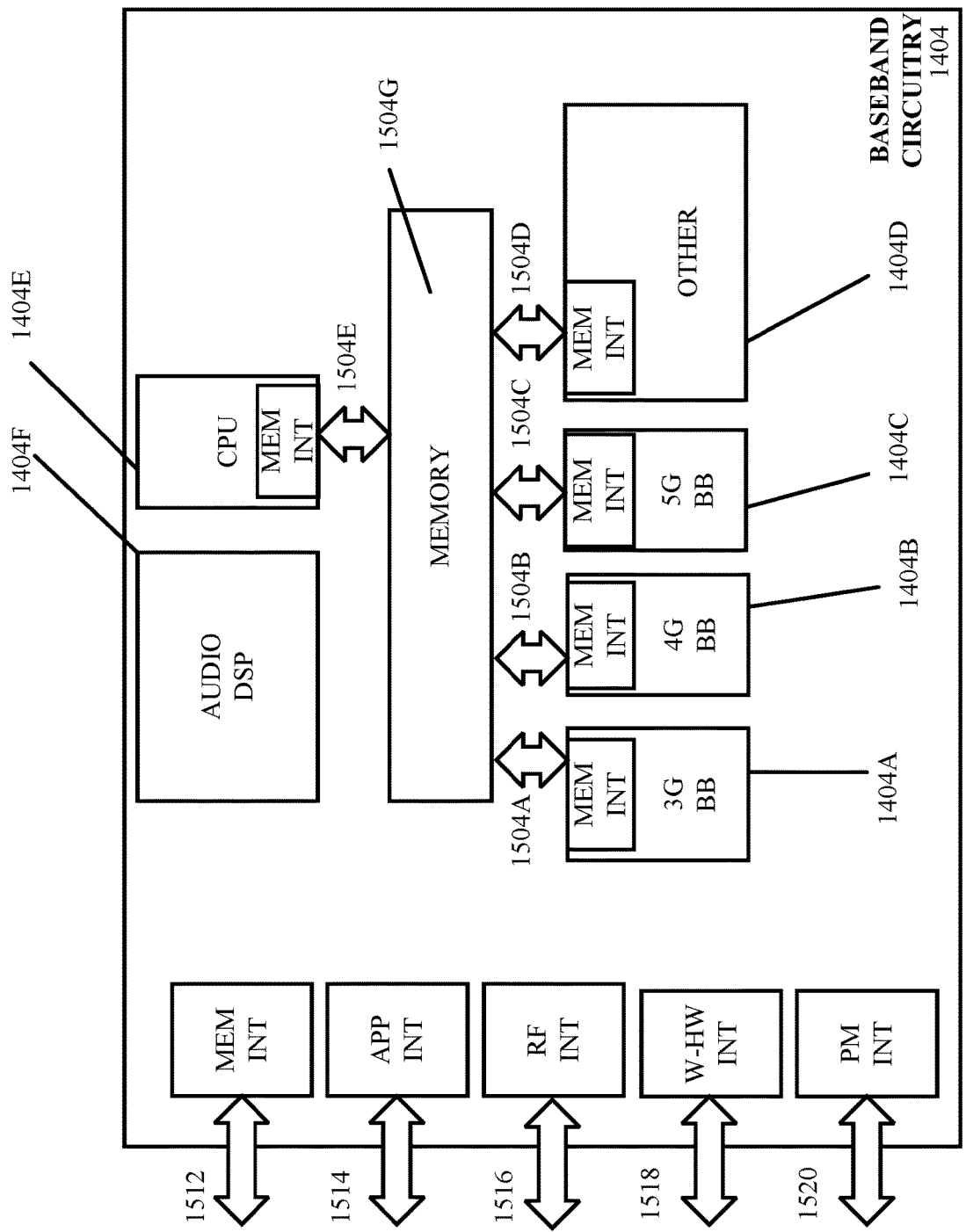
FIG. 15 illustrates example interfaces of baseband circuitry in accordance with some embodiments.

FIG. 15 illustrates example interfaces of baseband circuitry in accordance with some embodiments. As discussed above, the baseband circuitry 1404 of FIG. 14 may comprise processors 1404A-1404E and a memory 1404G utilized by said processors. Each of the processors 1404A-1404E may include a memory interface, 1504A-1504E, respectively, to send/receive data to/from the memory 1404G.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1512.

Figure 16:
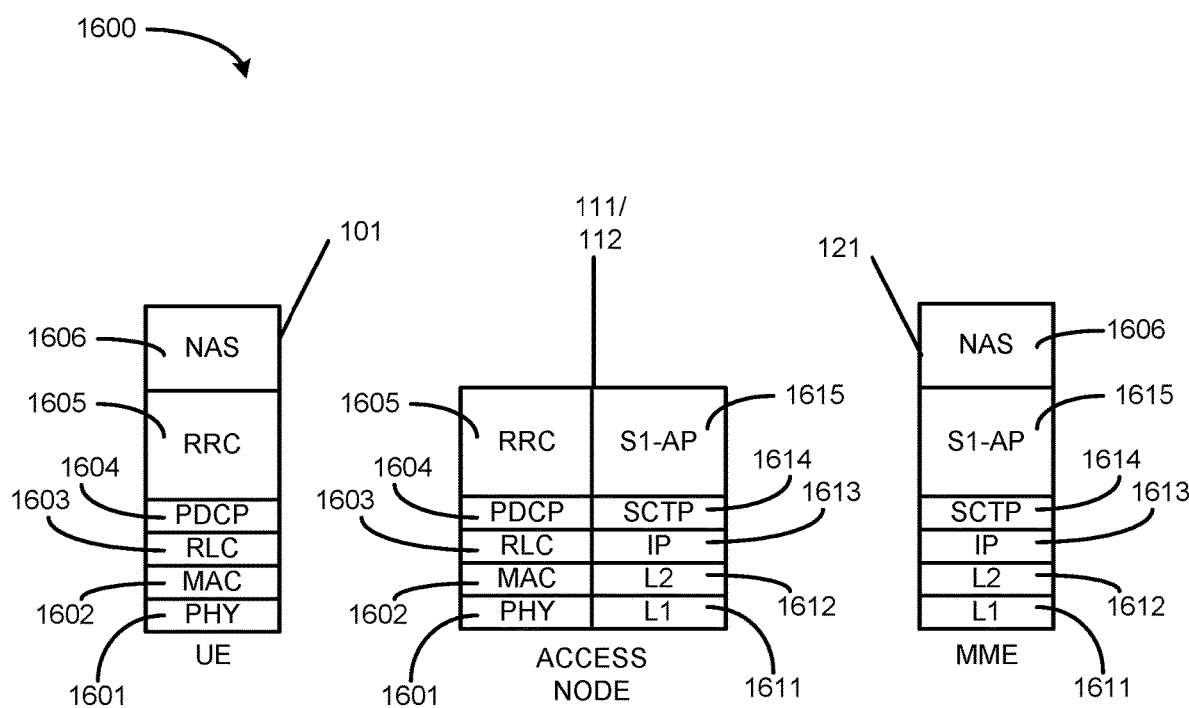
FIG. 16 is an illustration of a control plane protocol stack in accordance with some embodiments.

FIG. 16 is an illustration of a control plane protocol stack in accordance with some embodiments. In this embodiment, a control plane 1600 is shown as a communications protocol stack between the UE 101, the AN 111 (or alternatively, the AN 112), and the MME 121.

The PHY layer 1601 may transmit or receive information used by the MAC layer 1602 over one or more air interfaces. The PHY layer 1601 may further perform link adaptation or adaptive modulation and coding (AMC), power control, cell search (e.g., for initial synchronization and handover purposes), and other measurements used by higher layers, such as the RRC layer 1605. The PHY layer 1601 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1602 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1603 may operate in a plurality of modes of operation, including: Transparent Mode (TM), Unacknowledged Mode (UM), and Acknowledged Mode (AM). The RLC layer 1603 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1603 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1604 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1605 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the AN 111 may utilize a Uu interface (e.g., an LTE-Uu interface) to exchange control plane data via a protocol stack comprising the PHY layer 1601, the MAC layer 1602, the RLC layer 1603, the PDCP layer 1604, and the RRC layer 1605.

The non-access stratum (NAS) protocols 1606 form the highest stratum of the control plane between the UE 101 and the MME 121. The NAS protocols 1606 support the mobility of the UE 101 and the session management procedures to establish and maintain IP connectivity between the UE 101 and the P-GW 123.

The S1 Application Protocol (S1-AP) layer 1615 may support the functions of the S1 interface and comprise Elementary Procedures (EPs). An EP is a unit of interaction between the AN 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1614 may ensure reliable delivery of signaling messages between the AN 111 and the MME 121 based, in part, on the IP protocol, supported by the IP layer 1613. The L2 layer 1612 and the L layer 1611 may refer to communication links (e.g., wired or wireless) used by the RAN node and the MME to exchange information.

The AN 111 and the MME 121 may utilize an S1-MME interface to exchange control plane data via a protocol stack comprising the L1 layer 1611, the L2 layer 1612, the IP layer 1613, the SCTP layer 1614, and the S1-AP layer 1615.

Figure 17:
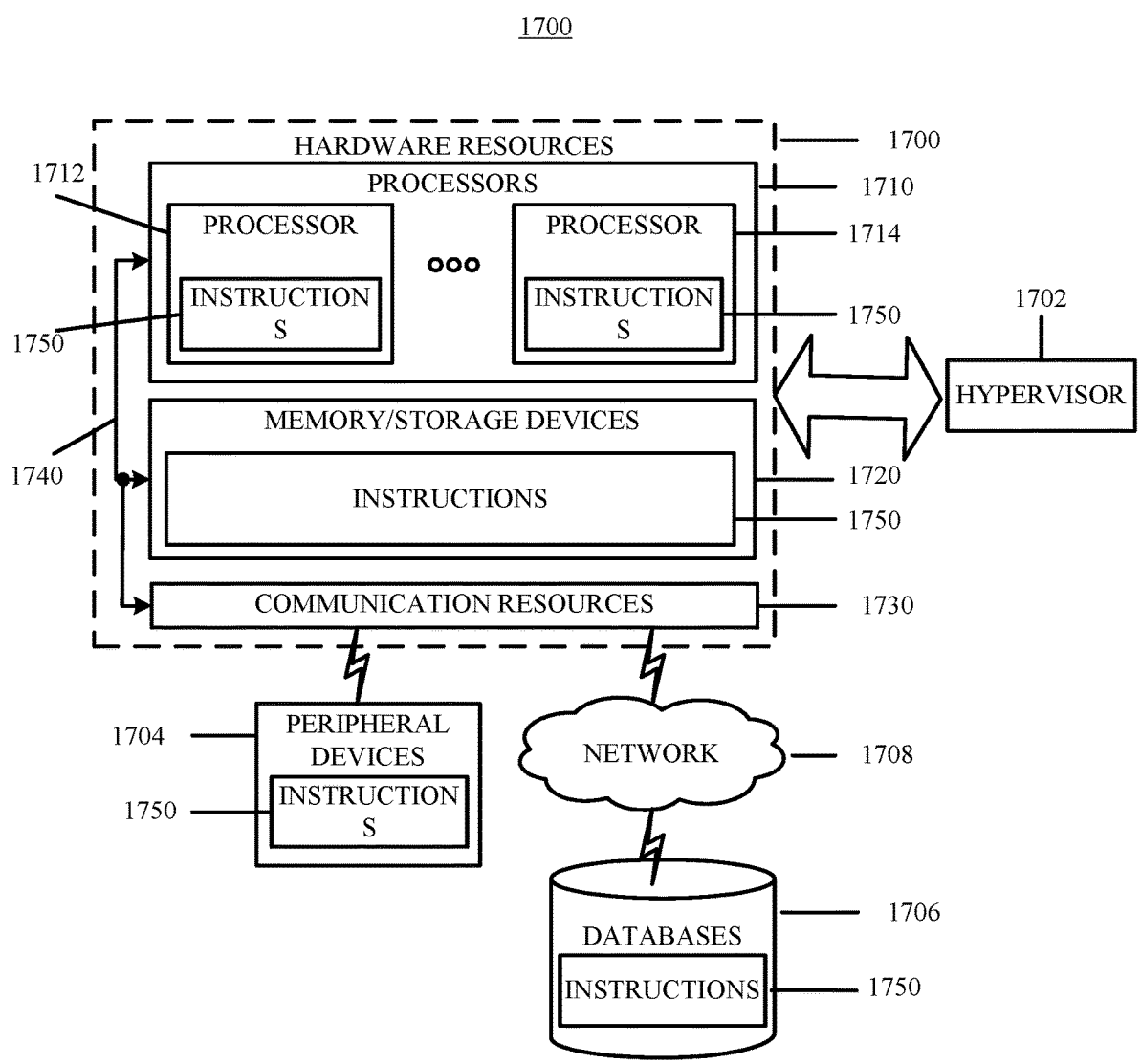
FIG. 17 is a block diagram illustrating components, according to some example embodiments, able to read instructions from a machine-readable or computer-readable medium and perform any one or more of the methodologies discussed herein.

FIG. 17 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1700 including one or more processors (or processor cores) 1710, one or more memory/storage devices 1720, and one or more communication resources 1730, each of which may be communicatively coupled via a bus 1740. For embodiments where node virtualization (e.g., NFV) is utilized, a hypervisor 1702 may be executed to provide an execution environment for one or more network slices/sub-slices to utilize the hardware resources 1700.

The processors 1710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1712 and a processor 1714.

The memory/storage devices 1720 may include main memory, disk storage, or any suitable combination thereof. The memory/storage devices 1720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1730 may include interconnection or network interface components or other suitable devices to communicate with one or more peripheral devices 1704 or one or more databases 1706 via a network 1708. For example, the communication resources 1730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1750 may comprise software, a program, an application, an applet, an app, or other executable code for causing at least any of the processors 1710 to perform any one or more of the methodologies discussed herein. The instructions 1750 may reside, completely or partially, within at least one of the processors 1710 (e.g., within the processor's cache memory), the memory/storage devices 1720, or any suitable combination thereof. Furthermore, any portion of the instructions 1750 may be transferred to the hardware resources 1700 from any combination of the peripheral devices 1704 or the databases 1706. Accordingly, the memory of processors 1710, the memory/storage devices 1720, the peripheral devices 1704, and the databases 1706 are examples of computer-readable and machine-readable media.

The following paragraphs describe examples of various embodiments.

Example 1 includes an apparatus for a user equipment (UE), including: a radio frequency (RF) interface; and processing circuitry configured to: determine, in response to a beam failure, a channel for transmission of a beam failure recovery request as one of: a Physical Uplink Control Channel (PUCCH), a non-contention based Physical Random Access Channel (PRACH), and a contention based Physical Random Access Channel (PRACH); and encode the beam failure recovery request for transmission to an access node via the determined channel using the RF interface.

Example 2 includes the apparatus of Example 1, wherein the processing circuitry is further configured to: determine the channel as the contention based PRACH if no resource is available for the PUCCH and the non-contention based PRACH.

Example 3 includes the apparatus of Example 1, wherein the processing circuitry is further configured to: determine the channel as the PUCCH; perform a re-transmission of the beam failure recovery request via the PUCCH if no response is received from the access node after transmission of the beam failure recovery request via the PUCCH; re-determine the channel as one of the contention based PRACH and the non-contention based PRACH in response to the re-transmission via the PUCCH is performed for a predetermined number or for a predetermined period without receiving a response from the access node; and perform a transmission of the beam failure recovery request via the re-determined channel.

Example 4 includes the apparatus of Example 3, wherein the processing circuitry is further configured to: re-determine the channel as the contention based PRACH if no resource is available for the non-contention based PRACH.

Example 5 includes the apparatus of Example 3, wherein the processing circuitry is further configured to: re-determine the channel as the non-contention based PRACH if there are available resources for the non-contention based PRACH.

Example 6 includes the apparatus of Example 1, wherein the processing circuitry is further configured to: determine the channel as the non-contention based PRACH if a beam correspondence is available at the UE; perform a re-transmission of the beam failure recovery request via the non-contention based PRACH if no response is received from the access node after transmission of the beam failure recovery request via the non-contention based PRACH; re-determine the channel as the contention based PRACH in response to the re-transmission via the non-contention based PRACH is performed for a predetermined number or for a predetermined period without receiving a response from the access node; and perform a transmission of the beam failure recovery request via the contention based PRACH.

Example 7 includes the apparatus of Example 1, wherein the processing circuitry is further configured to: determine the channel as the PUCCH if no beam correspondence is available at the UE; perform a re-transmission of the beam failure recovery request via the PUCCH if no response is received from the access node after transmission of the beam failure recovery request via the PUCCH; re-determine the channel as the non-contention based PRACH in response to the re-transmission via the PUCCH is performed for a predetermined number or for a predetermined period without receiving a response from the access node; and perform a transmission of the beam failure recovery request via the non-contention based PRACH.

Example 8 includes the apparatus of Example 7, wherein the processing circuitry is further configured to: perform a re-transmission of the beam failure recovery request via the non-contention based PRACH if no response is received from the access node after transmission of the beam failure recovery request via the non-contention based PRACH; re-determine the channel as the contention based PRACH in response to the re-transmission via the non-contention based PRACH is performed for a predetermined number or for a predetermined period without receiving a response from the access node; and perform a transmission of the beam failure recovery request via the contention based PRACH.

Example 9 includes the apparatus of Example 1, wherein if the channel is determined as the contention based PRACH, the processing circuitry is further configured to: encode a message for transmission to the access node, wherein the message includes the following information: an identification of the UE, information identifying the beam failure recovery request, and a beam quality reporting.

Example 10 includes the apparatus of Example 9, wherein the message further includes one or more beam indexes of one or more new transmit (Tx) beams of the access node if no beam correspondence is available at the UE.

Example 11 includes the apparatus of Example 9 or 10, wherein the beam quality reporting is based on a beam grouping or is not based on a beam grouping, which is pre-defined or configured by a higher layer signaling.

Example 12 includes an apparatus for an access node, including: a radio frequency (RF) interface; and processing circuitry configured to: decode a beam failure recovery request received from a user equipment (UE) using the RF interface via one of: a Physical Uplink Control Channel (PUCCH), a non-contention based Physical Random Access Channel (PRACH), and a contention based Physical Random Access Channel (PRACH).

Example 13 includes the apparatus of Example 12, wherein if the beam failure recovery request is received via the contention based PRACH, the processing circuitry is further configured to: determine one or more new beam pair links (BPLs) or indicator information for beam indication based on the decoded beam failure recovery request; and encode a message indicating the one or more new BPLs or the indicator information for transmission to the UE for beam indication.

Example 14 includes the apparatus of Example 12, wherein if the beam failure recovery request is received via the non-contention based PRACH or the contention based PRACH, and if a first set of resources for the non-contention based PRACH or the contention based PRACH are Code Division Multiplexed (CDMed) with a second set of resources for other non-contention based PRACHs or other contention based PRACHs, one or more beams of the access node associated with the first set of resources are the same as one or more beams of the access node associated with the second set of resources.

Example 15 includes the apparatus of Example 14, wherein the one or more beams includes one or more beams of the access node for a Synchronization Signal (SS) block or a Channel State Information Reference Signal (CSI-RS).

Example 16 includes the apparatus of Example 13, wherein if the beam failure recovery request is received via the non-contention based PRACH, the processing circuitry is further configured to: determine resources for the non-contention based PRACH when a Radio Resource Control (RRC) connection is set up between the access node and the UE.

Example 17 includes the apparatus of Example 16, wherein the processing circuitry is further configured to: release the resources when the RRC connection is released or when the UE handovers to another access node.

Example 18 includes an apparatus for a user equipment (UE), including: a radio frequency (RF) interface; and processing circuitry configured to: determine a first threshold for beam failure detection of a first beam of an access node for a Reference Signal (RS); decode a message received from the access node using the RF interface, wherein the message identifies one of: a first power offset for the first beam, and a second threshold for beam failure detection of the first beam; update the first threshold based on the message; and perform beam failure detection of the first beam based on the updated first threshold.

Example 19 includes the apparatus of Example 18, wherein the RS is a Synchronization Signal (SS) block or a Channel State Information Reference Signal (CSI-RS).

Example 20 includes the apparatus of Example 18 or 19, wherein if the message identifies the first power offset, the updated first threshold is based on the first threshold and the first power offset.

Example 21 includes the apparatus of Example 18 or 19, wherein if the message identifies the second threshold, the updated first threshold is equal to the second threshold.

Example 22 includes the apparatus of Example 18 or 19, wherein the processing circuitry is further configured to: determine a third threshold for identifying whether a second beam of the access node for the RS is a new transmit (Tx) beam of the access node, wherein the message further identifies one of: a second power offset for the second beam, and a fourth threshold for identifying whether the second beam is a new Tx beam; update the third threshold based on the message; and identify whether the second beam is a new Tx beam based on the updated third threshold.

Example 23 includes the apparatus of Example 22, wherein if the message further identifies the second power offset, the updated third threshold is based on the third threshold and the second power offset.

Example 24 includes the apparatus of Example 22, wherein if the message further identifies the fourth threshold, the updated third threshold is equal to the fourth threshold.

Example 25 includes the apparatus of Example 18, wherein the processing circuitry is further configured to: determine first beam quality of the first beam; and determine whether a beam failure occurs based on the first beam quality and the updated first threshold.

Example 26 includes the apparatus of Example 25, wherein the processing circuitry is further configured to: in response to the first beam quality being below the second threshold, determine a beam failure occurs.

Example 27 includes the apparatus of Example 22, wherein the processing circuitry is further configured to: determine second beam quality of the second beam; and identify whether the second beam is a new Tx beam based on the second beam quality and the updated third threshold.

Example 28 includes the apparatus of Example 27, wherein the processing circuitry is further configured to: in response to the second beam quality being above the updated third threshold, identify the second beam as a new Tx beam.

Example 29 includes the apparatus of Example 25 or 26, wherein the first beam quality is determined by measuring one of a Reference Signal Receiving Power (RSRP), a Reference Signal Receiving Quality (RSRQ), and a Signal to Interference plus Noise Ratio (SINR) of the first beam.

Example 30 includes the apparatus of Example 27 or 28, wherein the second beam quality is determined by measuring one of a Reference Signal Receiving Power (RSRP), a Reference Signal Receiving Quality (RSRQ), and a Signal to Interference plus Noise Ratio (SINR) of the second beam.

Example 31 includes the apparatus of Example 18, wherein the message is received from an access node via a dedicated signaling or a broadcast.

Example 32 includes an apparatus for an access node, including: a radio frequency (RF) interface; and processing circuitry configured to: encode a beam indication message for transmission to a user equipment (UE) via a Physical Downlink Control Channel (PDCCH) using the RF interface, wherein the beam indication message identifies a new receive (Rx) beam of the UE for reception of data via a Physical Downlink Shared Channel (PDSCH) associated with the PDCCH; and determine, based on the beam indication message, whether to configure a scheduling delay between the PDCCH and the PDSCH.

Example 33 includes the apparatus of Example 32, wherein the processing circuitry is further configured to: determine to configure no scheduling delay between the PDCCH and the PDSCH in response to the new Rx beam is the same as a current Rx beam of the UE.

Example 34 includes the apparatus of Example 32, wherein the processing circuitry is further configured to: determine to configure a scheduling delay between the PDCCH and the PDSCH in response to the new Rx beam is different from a current Rx beam of the UE.

Example 35 includes the apparatus of Example 34, wherein the scheduling delay includes a processing delay for processing the PDCCH at the UE and a switching delay for switching from the current Rx beam to the new Rx beam at the UE.

Example 36 includes the apparatus of Example 34, wherein the scheduling delay is pre-defined or configured by a higher layer signaling, or is determined based on a capability of the UE.

Example 37 includes an apparatus for an access node, including: a radio frequency (RF) interface; and processing circuitry configured to: decode a beam reporting received from a User Equipment (UE) using the RF interface, wherein the beam reporting identifies: one or more transmit (Tx) beams of the access node; and a tag, for each of the one or more Tx beams, indicating a Rx beam of the UE associated with the Tx beam; determine a new Tx beam among the one or more Tx beams based on the beam reporting; and determine, based on the beam reporting and the new Tx beam, whether to configure a scheduling delay between the PDCCH and the PDSCH.

Example 38 includes the apparatus of Example 37, wherein the processing circuitry is further configured to: if the tag for the new Tx beam indicates a Rx beam which is the same as a current Rx beam of the UE, determine to configure no scheduling delay between the PDCCH and the PDSCH.

Example 39 includes the apparatus of Example 37, wherein the processing circuitry is further configured to: if the tag for the new Tx beam indicates a Rx beam which is different from a current Rx beam of the UE, determine to configure a scheduling delay between the PDCCH and the PDSCH.

Example 40 includes the apparatus of Example 37, wherein for each of the one or more Tx beams, the tag is a Rx beam index corresponding to the Rx beam of the UE associated with the Tx beam.

Example 41 includes the apparatus of Example 37, wherein the range of values of the tag is based on an amount of Rx beams of the UE.

Example 42 includes the apparatus of Example 37, wherein the range of values of the tag is based on an amount of Rx beams of the UE associated with all Tx beams of the access node.

Example 43 includes an apparatus for an access node, including: a radio frequency (RF) interface; and processing circuitry configured to: decode a message received from a User Equipment (UE) using the RF interface, wherein the message is for determining whether to configure a scheduling delay between a Physical Downlink Control Channel (PDCCH) for transmission to the UE and a Physical Downlink Shared Channel (PDSCH) associated with the PDCCH for transmission to the UE; and determine, based on the message, whether to configure a scheduling delay between the PDCCH and the PDSCH.

Example 44 includes the apparatus of Example 43, wherein the message includes a one-bit indicator.

Example 45 includes the apparatus of Example 44, wherein the processing circuitry is further configured to: determine to configure no scheduling delay between the PDCCH and the PDSCH if the one-bit indicator is set to 0.

Example 46 includes the apparatus of Example 44, wherein the processing circuitry is further configured to: determine to configure a scheduling delay between the PDCCH and the PDSCH if the one-bit indicator is set to 1.

Example 47 includes an apparatus for a user equipment (UE), including: a radio frequency (RF) interface; and processing circuitry configured to: determine a new transmit (Tx) beam of an access node based on one or more Reference Signals (RSs) received from the access node; determine a new receive (Rx) beam of the UE associated with the new Tx beam; and encode a message based on the new Rx beam and a current Rx beam for transmission to the access node using the RF interface, wherein the message is for indicating to the access node whether to configure a scheduling delay between a Physical Downlink Control Channel (PDCCH) for transmission from the access node to the UE and a Physical Downlink Shared Channel (PDSCH) associated with the PDCCH for transmission from the access node to the UE.

Example 48 includes the apparatus of Example 47, wherein the message includes a one-bit indicator.

Example 49 includes the apparatus of Example 48, wherein the one-bit indicator is set to 0 if the new Rx beam is the same as the current Rx beam.

Example 50 includes the apparatus of Example 48, wherein the one-bit indicator is set to 1 if the new Rx beam is different from the current Rx beam.

Example 51 includes a method performed at a user equipment (UE), including: determining, in response to a beam failure, a channel for transmission of a beam failure recovery request as one of: a Physical Uplink Control Channel (PUCCH), a non-contention based Physical Random Access Channel (PRACH), and a contention based Physical Random Access Channel (PRACH); and encoding the beam failure recovery request for transmission to an access node via the determined channel.

Example 52 includes the method of Example 51, wherein the channel is determined as the contention based PRACH if no resource is available for the PUCCH and the non-contention based PRACH.

Example 53 includes the method of Example 51, wherein the channel is determined as the PUCCH, and the method further includes: performing a re-transmission of the beam failure recovery request via the PUCCH if no response is received from the access node after transmission of the beam failure recovery request via the PUCCH; re-determining the channel as one of the contention based PRACH and the non-contention based PRACH in response to the re-transmission via the PUCCH is performed for a predetermined number or for a predetermined period without receiving a response from the access node; and performing a transmission of the beam failure recovery request via the re-determined channel.

Example 54 includes the method of Example 53, wherein the channel is re-determined as the contention based PRACH if no resource is available for the non-contention based PRACH.

Example 55 includes the method of Example 53, wherein the channel is re-determined as the non-contention based PRACH if there are available resources for the non-contention based PRACH.

Example 56 includes the method of Example 51, wherein the channel is determined as the non-contention based PRACH if a beam correspondence is available at the UE, and the method further includes: performing a re-transmission of the beam failure recovery request via the non-contention based PRACH if no response is received from the access node after transmission of the beam failure recovery request via the non-contention based PRACH; re-determining the channel as the contention based PRACH in response to the re-transmission via the non-contention based PRACH is performed for a predetermined number or for a predetermined period without receiving a response from the access node; and performing a transmission of the beam failure recovery request via the contention based PRACH.

Example 57 includes the method of Example 51, wherein the channel is determined as the PUCCH if no beam correspondence is available at the UE, and the method further includes: performing a re-transmission of the beam failure recovery request via the PUCCH if no response is received from the access node after transmission of the beam failure recovery request via the PUCCH; re-determining the channel as the non-contention based PRACH in response to the re-transmission via the PUCCH is performed for a predetermined number or for a predetermined period without receiving a response from the access node; and performing a transmission of the beam failure recovery request via the non-contention based PRACH.

Example 58 includes the method of Example 57, wherein the method further includes: performing a re-transmission of the beam failure recovery request via the non-contention based PRACH if no response is received from the access node after transmission of the beam failure recovery request via the non-contention based PRACH; re-determining the channel as the contention based PRACH in response to the re-transmission via the non-contention based PRACH is performed for a predetermined number or for a predetermined period without receiving a response from the access node; and performing a transmission of the beam failure recovery request via the contention based PRACH.

Example 59 includes the method of Example 51, wherein if the channel is determined as the contention based PRACH, the method further includes: encoding a message for transmission to the access node, wherein the message includes the following information: an identification of the UE, information identifying the beam failure recovery request, and a beam quality reporting.

Example 60 includes the method of Example 59, wherein the message further includes one or more beam indexes of one or more new transmit (Tx) beams of the access node if no beam correspondence is available at the UE.

Example 61 includes the method of Example 59 or 60, wherein the beam quality reporting is based on a beam grouping or is not based on a beam grouping, which is pre-defined or configured by a higher layer signaling.

Example 62 includes a method performed at an access node, including: decoding a beam failure recovery request received from a user equipment (UE) via one of: a Physical Uplink Control Channel (PUCCH), a non-contention based Physical Random Access Channel (PRACH), and a contention based Physical Random Access Channel (PRACH).

Example 63 includes the method of Example 62, wherein if the beam failure recovery request is received via the contention based PRACH, the method further includes: determining one or more new beam pair links (BPLs) or indicator information for beam indication based on the decoded beam failure recovery request; and encoding a message indicating the one or more new BPLs or the indicator information for transmission to the UE for beam indication.

Example 64 includes the method of Example 62, wherein if the beam failure recovery request is received via the non-contention based PRACH or the contention based PRACH, and if a first set of resources for the non-contention based PRACH or the contention based PRACH are Code Division Multiplexed (CDMed) with a second set of resources for other non-contention based PRACHs or other contention based PRACHs, one or more beams of the access node associated with the first set of resources are the same as one or more beams of the access node associated with the second set of resources.

Example 65 includes the method of Example 64, wherein the one or more beams includes one or more beams of the access node for a Synchronization Signal (SS) block or a Channel State Information Reference Signal (CSI-RS).

Example 66 includes the method of Example 63, wherein if the beam failure recovery request is received via the non-contention based PRACH, the method further includes: determining resources for the non-contention based PRACH when a Radio Resource Control (RRC) connection is set up between the access node and the UE.

Example 67 includes the method of Example 66, wherein the method further includes: releasing the resources when the RRC connection is released or when the UE handovers to another access node.

Example 68 includes a method performed at a user equipment (UE), including: determining a first threshold for beam failure detection of a first beam of an access node for a Reference Signal (RS); decoding a message received from the access node, wherein the message identifies one of: a first power offset for the first beam, and a second threshold for beam failure detection of the first beam; updating the first threshold based on the message; and performing beam failure detection of the first beam based on the updated first threshold.

Example 69 includes the method of Example 68, wherein the RS is a Synchronization Signal (SS) block or a Channel State Information Reference Signal (CSI-RS).

Example 70 includes the method of Example 68 or 69, wherein if the message identifies the first power offset, the updated first threshold is based on the first threshold and the first power offset.

Example 71 includes the method of Example 68 or 69, wherein if the message identifies the second threshold, the updated first threshold is equal to the second threshold.

Example 72 includes the method of Example 68 or 69, wherein the method further includes: determining a third threshold for identifying whether a second beam of the access node for the RS is a new transmit (Tx) beam of the access node, wherein the message further identifies one of: a second power offset for the second beam, and a fourth threshold for identifying whether the second beam is a new Tx beam; updating the third threshold based on the message; and identifying whether the second beam is a new Tx beam based on the updated third threshold.

Example 73 includes the method of Example 72, wherein if the message further identifies the second power offset, the updated third threshold is based on the third threshold and the second power offset.

Example 74 includes the method of Example 72, wherein if the message further identifies the fourth threshold, the updated third threshold is equal to the fourth threshold.

Example 75 includes the method of Example 68, wherein the method further includes: determining first beam quality of the first beam; and determining whether a beam failure occurs based on the first beam quality and the updated first threshold.

Example 76 includes the method of Example 75, wherein the method further includes: in response to the first beam quality being below the second threshold, determining a beam failure occurs.

Example 77 includes the method of Example 72, wherein the method further includes: determining second beam quality of the second beam; and identifying whether the second beam is a new Tx beam based on the second beam quality and the updated third threshold.

Example 78 includes the method of Example 77, wherein the method further includes: in response to the second beam quality being above the updated third threshold, identifying the second beam as a new Tx beam.

Example 79 includes the method of Example 75 or 76, wherein the first beam quality is determined by measuring one of a Reference Signal Receiving Power (RSRP), a Reference Signal Receiving Quality (RSRQ), and a Signal to Interference plus Noise Ratio (SINR) of the first beam.

Example 80 includes the method of Example 77 or 78, wherein the second beam quality is determined by measuring one of a Reference Signal Receiving Power (RSRP), a Reference Signal Receiving Quality (RSRQ), and a Signal to Interference plus Noise Ratio (SINR) of the second beam.

Example 81 includes the method of Example 68, wherein the message is received from an access node via a dedicated signaling or a broadcast.

Example 82 includes a method performed at an access node, including: encoding a beam indication message for transmission via a Physical Downlink Control Channel (PDCCH) to a User Equipment (UE), wherein the beam indication message identifies a new receive (Rx) beam of the UE for reception of data via a Physical Downlink Shared Channel (PDSCH) associated with the PDCCH; and determining, based on the beam indication message, whether to configure a scheduling delay between the PDCCH and the PDSCH.

Example 83 includes the method of Example 82, wherein the method further includes: determining to configure no scheduling delay between the PDCCH and the PDSCH in response to the new Rx beam is the same as a current Rx beam of the UE.

Example 84 includes the method of Example 82, wherein the method further includes: determining to configure a scheduling delay between the PDCCH and the PDSCH in response to the new Rx beam is different from a current Rx beam of the UE.

Example 85 includes the method of Example 84, wherein the scheduling delay includes a processing delay for processing the PDCCH at the UE and a switching delay for switching from the current Rx beam to the new Rx beam at the UE.

Example 86 includes the method of Example 84, wherein the scheduling delay is pre-defined or configured by a higher layer signaling, or is determined based on a capability of the UE.

Example 87 includes a method performed at an access node, including: decoding a beam reporting received from a User Equipment (UE), wherein the beam reporting identifies: one or more transmit (Tx) beams of the access node; and a tag, for each of the one or more Tx beams, indicating a Rx beam of the UE associated with the Tx beam; determining a new Tx beam among the one or more Tx beams based on the beam reporting; and determining, based on the beam reporting and the new Tx beam, whether to configure a scheduling delay between the PDCCH and the PDSCH.

Example 88 includes the method of Example 87, wherein the method further includes: if the tag for the new Tx beam indicates a Rx beam which is the same as a current Rx beam of the UE, determining to configure no scheduling delay between the PDCCH and the PDSCH.

Example 89 includes the method of Example 87, wherein the method further includes: if the tag for the new Tx beam indicates a Rx beam which is different from a current Rx beam of the UE, determining to configure a scheduling delay between the PDCCH and the PDSCH.

Example 90 includes the method of Example 87, wherein for each of the one or more Tx beams, the tag is a Rx beam index corresponding to the Rx beam of the UE associated with the Tx beam.

Example 91 includes the method of Example 87, wherein the range of values of the tag is based on an amount of Rx beams of the UE.

Example 92 includes the method of Example 87, wherein the range of values of the tag is based on an amount of Rx beams of the UE associated with all Tx beams of the access node.

Example 93 includes a method performed at an access node, including: decoding a message received from a User Equipment (UE), wherein the message is for determining whether to configure a scheduling delay between a Physical Downlink Control Channel (PDCCH) for transmission to the UE and a Physical Downlink Shared Channel (PDSCH) associated with the PDCCH for transmission to the UE; and determining, based on the message, whether to configure a scheduling delay between the PDCCH and the PDSCH.

Example 94 includes the method of Example 93, wherein the message includes a one-bit indicator.

Example 95 includes the method of Example 94, wherein the method further includes: determining to configure no scheduling delay between the PDCCH and the PDSCH if the one-bit indicator is set to 0.

Example 96 includes the method of Example 94, wherein the method further includes: determining to configure a scheduling delay between the PDCCH and the PDSCH if the one-bit indicator is set to 1.

Example 97 includes a method performed at a user equipment (UE), including: determining a new transmit (Tx) beam of an access node based on one or more Reference Signals (RSs) received from the access node; determining a new receive (Rx) beam of the UE associated with the new Tx beam; and encoding a message for transmission to the access node based on the new Rx beam and a current Rx beam, wherein the message is for indicating to the access node whether to configure a scheduling delay between a Physical Downlink Control Channel (PDCCH) for transmission from the access node to the UE and a Physical Downlink Shared Channel (PDSCH) associated with the PDCCH for transmission from the access node to the UE.

Example 98 includes the method of Example 97, wherein the message includes a one-bit indicator.

Example 99 includes the method of Example 98, wherein the one-bit indicator is set to 0 if the new Rx beam is the same as the current Rx beam.

Example 100 includes the method of Example 98, wherein the one-bit indicator is set to 1 if the new Rx beam is different from the current Rx beam.

Example 101 includes a computer-readable medium having instructions stored thereon, the instructions when executed by one or more processor(s) causing the processor(s) to perform the method of any of Examples 51-100.

Example 102 includes an apparatus for a user equipment (UE), comprising means for performing the actions of the method of any of Examples 51-61, 68-81 and 97-100.

Example 103 includes an apparatus for an access node (AN), comprising means for performing the actions of the method of any of Examples 62-67 and 82-96.

Example 104 includes a user equipment (UE) as shown and described in the description.

Example 105 includes an access node (AN) as shown and described in the description.

Example 106 includes a method performed at a user equipment (UE) as shown and described in the description.

Example 107 includes a method performed at an access node (AN) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus for a user equipment (UE), comprising:
a radio frequency (RF) interface; and
processing circuitry configured to:
determine, in response to a beam failure, a channel for transmission of a beam failure recovery request as one of: a Physical Uplink Control Channel (PUCCH), a non-contention based Physical Random Access Channel (PRACH), and a contention based Physical Random Access Channel (PRACH);
determine the channel as the non-contention based PRACH;
encode the beam failure recovery request for transmission to an access node via the non-contention based PRACH using the RF interface
perform a re-transmission of the beam failure recovery request via the non-contention based PRACH if no response is received from the access node after transmission of the beam failure recovery request via the non-contention based PRACH;
re-determine the channel as the contention based PRACH in response to the re-transmission via the non-contention based PRACH being performed for a predetermined number or for a predetermined period without receiving a response from the access node; and
perform a transmission of the beam failure recovery request via the contention based PRACH.

2. The apparatus of claim 1, wherein the processing circuitry is further configured to:
determine the channel as the contention based PRACH if no resource is available for the PUCCH and the non-contention based PRACH.

3. The apparatus of claim 1, wherein the processing circuitry is further configured to:
determine the channel as the PUCCH;
perform a re-transmission of the beam failure recovery request via the PUCCH if no response is received from the access node after transmission of the beam failure recovery request via the PUCCH;
re-determine the channel as one of the contention based PRACH and the non-contention based PRACH in response to the re-transmission via the PUCCH is performed for a predetermined number or for a predetermined period without receiving a response from the access node; and
perform a transmission of the beam failure recovery request via the re-determined channel.

4. The apparatus of claim 3, wherein the processing circuitry is further configured to:
re-determine the channel as the contention based PRACH if no resource is available for the non-contention based PRACH.

5. The apparatus of claim 3, wherein the processing circuitry is further configured to:
re-determine the channel as the non-contention based PRACH if there are available resources for the non-contention based PRACH.

6. The apparatus of claim 1, wherein the processing circuitry is further configured to determine the channel as the non-contention based PRACH if a beam correspondence is available at the UE.

7. The apparatus of claim 1, wherein the processing circuitry is further configured to:
determine the channel as the PUCCH if no beam correspondence is available at the UE;
perform a re-transmission of the beam failure recovery request via the PUCCH if no response is received from the access node after transmission of the beam failure recovery request via the PUCCH;
re-determine the channel as the non-contention based PRACH in response to the re-transmission via the PUCCH is performed for a predetermined number or for a predetermined period without receiving a response from the access node; and
perform a transmission of the beam failure recovery request via the non-contention based PRACH.

8. The apparatus of claim 7, wherein the processing circuitry is further configured to:
perform a re-transmission of the beam failure recovery request via the non-contention based PRACH if no response is received from the access node after transmission of the beam failure recovery request via the non-contention based PRACH;
re-determine the channel as the contention based PRACH in response to the re-transmission via the non-contention based PRACH is performed for a predetermined number or for a predetermined period without receiving a response from the access node; and
perform a transmission of the beam failure recovery request via the contention based PRACH.

9. The apparatus of claim 1, wherein if the channel is determined as the contention based PRACH, the processing circuitry is further configured to: encode a message for transmission to the access node, wherein the message comprises the following information: an identification of the UE, information identifying the beam failure recovery request, and a beam quality reporting.

10. The apparatus of claim 9, wherein the message further comprises one or more beam indexes of one or more new transmit (Tx) beams of the access node if no beam correspondence is available at the UE.

11. The apparatus of claim 9, wherein the beam quality reporting is based on a beam grouping or is not based on a beam grouping, which is pre-defined or configured by a higher layer signaling.

12. The apparatus of claim 9, wherein the message comprises a Msg 3 of a contention based PRACH.

13. An apparatus for an access node, comprising:
a radio frequency (RF) interface; and
processing circuitry configured to:
decode a beam failure recovery request received from a user equipment (UE) using the RF interface via one of: a Physical Uplink Control Channel (PUCCH), a non-contention based Physical Random Access Channel (PRACH), and a contention based Physical Random Access Channel (PRACH); and
wherein if the beam failure recovery request is received via the non-contention based PRACH or the contention based PRACH, and if a first set of resources for the non-contention based PRACH or the contention based PRACH are Code Division Multiplexed (CDMed) with a second set of resources for other non-contention based PRACHs or other contention based PRACHs, one or more beams of the access node associated with the first set of resources are the same as one or more beams of the access node associated with the second set of resources.

14. The apparatus of claim 13, wherein if the beam failure recovery request is received via the contention based PRACH, the processing circuitry is further configured to:
   determine one or more new beam pair links (BPLs) or indicator information for beam indication based on the decoded beam failure recovery request; and
   encode a message indicating the one or more new BPLs or the indicator information for transmission to the UE for beam indication.

15. The apparatus of claim 13, wherein the one or more beams comprises one or more beams of the access node for a Synchronization Signal (SS) block or a Channel State Information Reference Signal (CSI-RS).

16. The apparatus of claim 14, wherein if the beam failure recovery request is received via the non-contention based PRACH, the processing circuitry is further configured to: determine resources for the non-contention based PRACH when a Radio Resource Control (RRC) connection is set up between the access node and the UE.

17. The apparatus of claim 16, wherein the processing circuitry is further configured to: release the resources when the RRC connection is released or when the UE handovers to another access node.

18. The apparatus of claim 14, wherein the message indicating the one or more new BPLs comprises a Msg 4 of a contention based PRACH.

19. An apparatus for a user equipment (UE), comprising:
   a radio frequency (RF) interface; and
   processing circuitry configured to:
      determine a first threshold for beam failure detection of a first beam of an access node for a Reference Signal (RS);
      decode a message received from the access node using the RF interface, wherein the message identifies one of: a first power offset for the first beam, and a second threshold for beam failure detection of the first beam;
      update the first threshold based on the message, wherein if the message identifies the second threshold, the updated first threshold is equal to the second threshold; and
      perform beam failure detection of the first beam based on the updated first threshold.

20. The apparatus of claim 19, wherein the RS is a Synchronization Signal (SS) block or a Channel State Information Reference Signal (CSI-RS).

21. The apparatus of claim 19, wherein if the message identifies the first power offset, the updated first threshold is based on the first threshold and the first power offset.

22. The apparatus of claim 19, wherein the processing circuitry is further configured to:
   determine a third threshold for identifying whether a second beam of the access node for the RS is a new transmit (Tx) beam of the access node, wherein the message further identifies one of: a second power offset for the second beam, and a fourth threshold for identifying whether the second beam is a new Tx beam;
   update the third threshold based on the message; and
   identify whether the second beam is a new Tx beam based on the updated third threshold.

23. The apparatus of claim 22, wherein if the message further identifies the second power offset, the updated third threshold is based on the third threshold and the second power offset.

24. The apparatus of claim 22, wherein if the message further identifies the fourth threshold, the updated third threshold is equal to the fourth threshold.

25. The apparatus of claim 19, wherein the processing circuitry is further configured to:
   determine first beam quality of the first beam; and
   determine whether a beam failure occurs based on the first beam quality and the updated first threshold.

* * * * *